US009991529B2

(12) United States Patent
Hasegawa et al.

(10) Patent No.: US 9,991,529 B2
(45) Date of Patent: Jun. 5, 2018

(54) FUEL CELL SYSTEM AND OPERATING METHOD OF A FUEL CELL

(75) Inventors: Shigeki Hasegawa, Gotenba (JP); Masaki Ando, Gotenba (JP); Kenichi Hamada, Kawasaki (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 654 days.

(21) Appl. No.: 12/673,311

(22) PCT Filed: Mar. 26, 2009

(86) PCT No.: PCT/IB2009/005332
§ 371 (c)(1),
(2), (4) Date: Mar. 30, 2010

(87) PCT Pub. No.: WO2009/118649
PCT Pub. Date: Oct. 1, 2009

(65) Prior Publication Data
US 2011/0200896 A1    Aug. 18, 2011

(30) Foreign Application Priority Data

Mar. 26, 2008  (JP) .................. 2008-080361
Jun. 30, 2008  (JP) .................. 2008-171365

(51) Int. Cl.
*H01M 8/04089*   (2016.01)
*H01M 8/04291*   (2016.01)
(Continued)

(52) U.S. Cl.
CPC ....... *H01M 8/04104* (2013.01); *H01M 8/045* (2013.01); *H01M 8/0485* (2013.01);
(Continued)

(58) Field of Classification Search
CPC ......... H01M 8/04104; H01M 8/04119; H01M 8/04149; H01M 8/04291; H01M 8/045;
(Continued)

(56) References Cited

U.S. PATENT DOCUMENTS 6,376,111 B1    4/2002  Mathias et al.
6,500,579 B1 *  12/2002 Maeda ............... H01M 8/0228
                                                  429/454
(Continued)

FOREIGN PATENT DOCUMENTS

JP    06-504403 A    5/1994
JP    2001-006698 A  1/2001
(Continued)

OTHER PUBLICATIONS

Japanese Office Action for corresponding JP Patent Application No. 2010-522510 dated Jun. 12, 2012.
(Continued)

*Primary Examiner* — Milton I Cano
*Assistant Examiner* — Lingwen R Zeng
(74) *Attorney, Agent, or Firm* — Sughrue Mion, PLLC

(57) ABSTRACT

A fuel cell system operates under at least one of the conditions of no humidity or high temperature, and an operating method thereof, are characterized in that a fuel cell has a fuel gas flow path and an oxidant gas flow path arranged such that fuel gas and oxidant gas flow in opposite directions, a determining apparatus that determines the amount of water near the oxidant gas flow path inlet, and a fuel gas control apparatus which increases the amount of water near the oxidant gas flow path inlet by increasing the fuel gas flowrate and/or reducing the fuel gas pressure if it is determined in the determining apparatus that the amount of water near the oxidant gas flow path inlet is insufficient.

23 Claims, 13 Drawing Sheets

(51) Int. Cl.
*H01M 8/04828* (2016.01)
*H01M 8/04492* (2016.01)
*H01M 8/04746* (2016.01)
*H01M 8/04119* (2016.01)

(52) U.S. Cl.
CPC ... *H01M 8/04291* (2013.01); *H01M 8/04507* (2013.01); *H01M 8/04529* (2013.01); *H01M 8/04753* (2013.01); *H01M 8/04783* (2013.01); *H01M 8/04119* (2013.01); *H01M 8/04149* (2013.01)

(58) Field of Classification Search
CPC ......... H01M 8/04507; H01M 8/04529; H01M 8/04753; H01M 8/04783; H01M 8/0485
USPC ... 429/61–64, 400, 403, 427, 428, 450, 451, 429/443, 446, 505, 413, 414
See application file for complete search history.

(56) References Cited

U.S. PATENT DOCUMENTS

| | | | |
|---|---|---|---|
| 2004/0096709 A1* | 5/2004 | Darling et al. | 429/13 |
| 2004/0137298 A1* | 7/2004 | Sugiura et al. | 429/32 |
| 2005/0175872 A1 | 8/2005 | Trabold et al. | |
| 2006/0166058 A1* | 7/2006 | Kudo | 429/22 |
| 2006/0263653 A1 | 11/2006 | Sinha et al. | |
| 2007/0259231 A1* | 11/2007 | Sone et al. | 429/24 |
| 2007/0264551 A1* | 11/2007 | Matsunaga | 429/29 |
| 2007/0287040 A1 | 12/2007 | Toro | |
| 2011/0008699 A1* | 1/2011 | Hashimoto et al. | 429/444 |

FOREIGN PATENT DOCUMENTS

| | | |
|---|---|---|
| JP | 2001-148253 A | 5/2001 |
| JP | 2002-352827 A | 12/2002 |
| JP | 2005-100952 A | 4/2005 |
| JP | 3736475 B2 | 11/2005 |
| JP | 2006-210004 A | 8/2006 |
| JP | 2007-220322 A | 8/2007 |
| JP | 2008-041625 A | 2/2008 |
| WO | 92/13365 A1 | 8/1992 |
| WO | 2009/005158 A1 | 1/2009 |

OTHER PUBLICATIONS

Qiangu Yan et al.: "Investigation of water transport through membrane in a PEM fuel cell by water balance experiments", Journal of Power Sources, Elsevier, Amsterdam, NL, vo. 158, No. 1, Jul. 14, 2006, pp. 316-325, XP025085192.

* cited by examiner

FUEL CELL SYSTEM AND OPERATING METHOD OF A FUEL CELL

INCORPORATION BY REFERENCE

The disclosure of Japanese Patent Applications No. 2008-080361 filed on Mar. 26, 2008 and No. 2008-171365 filed on Jun. 30, 2008, including the specifications, drawings and abstracts are incorporated herein by references in their entireties.

BACKGROUND OF THE INVENTION

1. Field of the Invention

The invention relates to a fuel cell system and an operating method of a fuel cell which prevent the uneven distribution of water on the surface of a single cell.

2. Description of the Related Art

Fuel cells convert chemical energy directly into electric energy by supplying a fuel and an oxidant to two electrodes that are electrically connected together, and electrochemically oxidizing the fuel. Unlike thermal power generation, fuel cells are highly efficient in converting energy because they are not limited by the Carnot cycle. Fuel cells are normally formed of a stack of a plurality of single cells, each of which is basically made up of a membrane electrode assembly (MEA) in which an electrolyte membrane is sandwiched between a pair of electrodes. Among fuel cells, polymer electrolyte fuel cells having a polymer electrolyte membrane as the electrolyte membrane are particularly attractive as portable power supplies and power supplies for movable objects because they can easily be made small and operate at low temperatures.

In polymer electrolyte fuel cells, when hydrogen is used as the fuel, the reaction in Expression (1) below takes place at the anode (i.e., the fuel electrode).

$$H_2 \rightarrow 2H^+ + 2e^- \qquad (1)$$

The electrons that are freed as a result of Expression (1) above pass through an external circuit where they perform work at an external load and then reach the cathode (i.e., the oxidant pole). There, the protons created by Expression (1) move through the polymer electrolyte membrane from the anode to the cathode in a hydrated state from electro-osmosis.

Also, when oxygen is used as the oxidant, the reaction in Expression (2) takes place at the cathode.

$$2H^+ + (\tfrac{1}{2})O_2 + 2e^- \rightarrow H_2O \qquad (2)$$

The water produced at the cathode passes mainly through a gas diffusion layer, after which it is discharged out of the fuel cell. In this way, the fuel cell is a clean power source that emits nothing but water.

If there is an excessive amount of water (in this specification, the term "water" is used in a broad sense and thus also includes moisture and the like) that is to be emitted, water that has condensed in the fuel cell may block gaps in the catalyst layer or the gas diffusion layer, and in an extreme case, even block the gas flow path and thus impede the supply of gas, preventing a sufficient amount of gas for generating power from reaching the catalyst layer, which would cause the output of the fuel cell to decrease. Also, if there is not enough water in the fuel cell, it will increase the internal resistance, also causing the output and power generating efficiency of the fuel cell to decrease. Various technologies, which are described below, have previously been developed to solve this problem.

Japanese Patent Application Publication No. 2002-352827 (JP-A-2002-352827) describes technology relating to a fuel cell system that includes i) amount of water determining means for determining an excess or insufficiency in the amount of water in the fuel cell, and ii) gas supply amount controlling means for controlling the gas supply amount of oxygen and/or hydrogen supplied to the fuel cell, based on the determination results from the amount of water determining means regarding an excess or insufficiency in the amount of water in the fuel cell.

Japanese Patent Application Publication No. 2006-210004 (JP-A-2006-210004) describes technology relating to a fuel cell system that includes i) air amount adjusting means for adjusting the amount of air flowing in an oxidant gas flow path, ii) determining means for determining whether an electrolyte membrane is drying out, and iii) controlling means for controlling the pressure of air flowing in the oxidant gas flow path so that it becomes higher than it is during normal operation, when it is determined that the electrolyte membrane is drying out.

Published Japanese Translation of PCT application No. 6-504403 (JP-A-6-504403) describes technology for removing water in a cathode by adjusting the water vapor partial pressure in the fuel gas so that water or water vapor moves from the cathode to the anode through the electrolyte membrane.

Japanese Patent No. 3736475 describes technology for promoting the supply of amount of water to a fuel gas flow path inlet portion via an electrolyte membrane by flocculating and recovering the water in the oxidant gas. This is achieved by providing a fuel gas flow path and an oxidant gas flow path such that fuel gas and oxidant gas flow opposing each other in the fuel cell, and further providing a coolant path for cooling the oxidant gas flow path outlet portion.

Japanese Patent Application Publication No. 2001-6698 (JP-A-2001-6698) describes technology for suppressing the evaporation of water vapor into oxidant gas by reducing the drying rate in an oxidant gas flow path. This is achieved by making the temperature at the oxidant gas flow path inlet lower than the temperature at the oxidant gas flow path outlet when the fuel cell is operating, and making the gas diffusion of the diffusion layer at the oxidant gas flow path inlet lower than the gas diffusion at the oxidant gas flow path outlet.

Water tends to be unevenly distributed on a surface of a single cell of a fuel cell supplied with non-humidified fuel gas and oxidant gas is operated, i.e., during non-humidified operation. That is, the area near the oxidant gas flow path inlet tends become dry, while the area near the oxidant gas flow path outlet tends to become wet. Therefore, it is necessary to try to homogenize the amount of water on the surface of the single cell. This is also true when the temperature of the membrane electrode assembly is high, i.e., 70° C. or higher. The technologies described in JP-A-2002-352827 and JP-A-2006-210004 both include means for solving the problem, i.e., they both determine excess or insufficiency in the amount of water of the overall fuel cell and adjust the gas based on that determination. However, neither of these technologies considers the uneven distribution of water on the surface of a single cell. Therefore, neither of these technologies is considered to be effective when there is too much or too little water on the surface of a single cell. In particular, in the controlling means described in JP-A-2006-210004, the means for solving the problem by increasing the air pressure is thought to have the drawback of reducing fuel efficiency due to the increase in air compressor output. The technologies described in JP-A-6-504403, Japanese Patent No. 3736475, and JP-A-2001-6698 all have means for solving the problem that involve passing the water accumulated near the mainly the outlet of the oxidant gas flow path through the electrolyte membrane to the fuel gas flow path. In particular, the technologies described in Japanese Patent No. 3736475 and JP-A-2001-6698 have means for solving the problem that involve circulating water from near the oxidant gas flow path outlet→near the fuel gas flow path inlet→near the fuel gas flow path outlet→near the oxidant gas flow path inlet, because the oxidant gas flow path and the fuel gas flow path are opposing. However, even with the technologies described in JP-A-6-504403, Japanese Patent No. 3736475, and JP-A-2001-6698, determining means for determining whether there is an excess or insufficiency in the amount of water, as well as gas controlling means for adjusting the gas based on the determination made by that determining means, are not taken into consideration. Also, the technology described in JP-A-6-504403 is intended to prevent flooding in the oxidant gas flow path, not to prevent the area near the oxidant gas flow path inlet from drying out.

SUMMARY OF THE INVENTION

In view of the foregoing problems, this invention thus provides a fuel cell system and an operating method of a fuel cell which prevent the uneven distribution of water on the surface of a single cell.

Therefore, a first aspect of the invention relates to a fuel cell system which is provided with a fuel cell having a stack that has a single cell that includes a membrane electrode assembly in which a polymer electrolyte membrane is sandwiched between a pair of electrodes, and which supplies fuel gas and oxidant gas to the fuel cell and is operated under at least one of the conditions that i) there be no humidity or ii) the temperature of the membrane electrode assembly be at least 70° C. The fuel cell has a fuel gas flow path on one side of the membrane electrode assembly and an oxidant gas flow path on the other side of the membrane electrode assembly, and the fuel gas flow path and the oxidant gas flow path are arranged such that the fuel gas and the oxidant gas flow in opposite directions. The fuel cell system includes a determining apparatus that determines the amount of water near the oxidant gas flow path inlet, and a fuel gas control apparatus that increases the amount of water near the oxidant gas flow path inlet by increasing the fuel gas flowrate and/or reducing the fuel gas pressure if it is determined by the determining apparatus that the amount of water near the oxidant gas flow path inlet is insufficient.

With the fuel cell system having this kind of structure, a greater amount of water can be transferred from near the fuel gas flow path outlet to near the oxidant gas flow path inlet through the polymer electrolyte membrane by transferring a greater amount of water in the fuel gas to near the fuel gas flow path outlet after water near the oxidant gas flow path outlet has been transferred to near the fuel gas flow path inlet through the polymer electrolyte membrane. Accordingly, it is possible to adjust the amount of water near the oxidant gas flow path inlet which tends to become dry in the related art, as well as near the oxidant gas flow path outlet which tends to become wet in the related art. As a result, it is possible to prevent water from becoming unevenly distributed on the surface of the single cell while under a non-humid condition and/or a high temperature condition. Also, the fuel cell system of the invention has the determining apparatus so it is possible to accurately ascertain an insufficiency in the amount of water near the oxidant gas flow path inlet.

The fuel cell system may also include a determining apparatus that determines the amount of water near the oxidant gas flow path inlet and/or near the oxidant gas flow path outlet, and at least one of i) a fuel gas control apparatus which increases the amount of water near the oxidant gas flow path inlet and decreases the amount of water near the oxidant gas flow path outlet by promoting the transfer of water near the oxidant gas flow path outlet to near the oxidant gas flow path inlet via the fuel gas flow path by increasing the fuel gas flowrate and/or reducing the fuel gas pressure if it is determined in the determining apparatus that the amount of water near the oxidant gas flow path inlet is insufficient and/or that the amount of water near the oxidant gas flow path outlet is excessive, or ii) an oxidant gas control apparatus which decreases the amount of water that is carried out of the cell by the oxidant gas and increases the amount of water that can be transferred from the oxidant gas flow path outlet side to the fuel gas flow path inlet side by decreasing the oxidant gas flowrate and/or increasing the oxidant gas pressure if it is determined in the determining apparatus that the amount of water near the oxidant gas flow path inlet and/or the oxidant gas flow path outlet is insufficient.

With the fuel cell system having this kind of structure, a greater amount of water can be transferred from near the fuel gas flow path outlet to near the oxidant gas flow path inlet through the polymer electrolyte membrane by transferring a greater amount of water in the fuel gas to near the fuel gas flow path outlet after water near the oxidant gas flow path outlet has been transferred to near the fuel gas flow path inlet through the polymer electrolyte membrane. Accordingly, it is possible to adjust the amount of water near the oxidant gas flow path inlet which tends to become dry in the related art, as well as near the oxidant gas flow path outlet which tends to become wet in the related art. As a result, it is possible to prevent water from becoming unevenly distributed on the surface of the single cell while under a non-humid condition and/or a high temperature condition. Also, according to the invention, water can be accumulated near the oxidant gas flow path outlet by keeping down the amount of water that is carried away by the oxidant gas and discharged outside of the fuel cell system of the invention. Furthermore, the fuel cell system of the invention has the determining apparatus so it is possible to accurately ascertain an insufficiency or excess in the amount of water near the oxidant gas flow path inlet and outlet.

Also, in the fuel cell system described above, the determining apparatus may be a determining apparatus A which measures a resistance value of the overall fuel cell and determines that the amount of water near the oxidant gas flow path inlet is insufficient and/or that the amount of water near the oxidant gas flow path outlet is insufficient, when the resistance value exceeds 105% of a minimum value of the premeasured resistance of the single cell and/or the stack at each of a plurality of temperatures.

The fuel cell system having this kind of structure is able to accurately ascertain an insufficiency in the amount of water near the oxidant gas flow path inlet and outlet using the simple method of measuring the resistance value of the overall fuel cell.

Also, in the fuel cell system described above, the determining apparatus may be a determining apparatus B which measures a resistance value and a voltage of the overall fuel cell and determines that the amount of water near the oxidant gas flow path inlet is excessive and/or that the amount of water near the oxidant gas flow path outlet is excessive, when the resistance value is less than 105% of the minimum value (a wet state) of the premeasured resistance and the voltage is less than 95% of a maximum value of the premeasured voltage of the single cell and/or the stack at each of a plurality of temperatures.

The fuel cell system having this kind of structure is able to accurately ascertain an excess in the amount of water near the oxidant gas flow path inlet and outlet using the simple method of measuring the voltage of the overall fuel cell.

Also, in the fuel cell system described above, the determining apparatus may be a determining apparatus C which measures a pressure drop of oxidant gas flowing through the oxidant gas flow path and determines that the amount of water near the oxidant gas flow path inlet is insufficient and/or that the amount of water near the oxidant gas flow path outlet is insufficient, when the pressure drop is less than 105% of a minimum value of the premeasured pressure drop of oxidant gas flowing through the oxidant gas flow path.

The fuel cell system having this kind of structure is able to accurately ascertain an insufficiency in the amount of water near the oxidant gas flow path inlet and outlet using the simple method of measuring the pressure drop of oxidant gas flowing through the oxidant gas flow path.

Also, in the fuel cell system described above, the determining apparatus may be a determining apparatus D which measures a pressure drop of oxidant gas flowing through the oxidant gas flow path and determines that the amount of water near the oxidant gas flow path inlet is excessive and/or that the amount of water near the oxidant gas flow path outlet is excessive, when the pressure drop exceeds 105% of a maximum value of the premeasured pressure drop of oxidant gas flowing through the oxidant gas flow path.

The fuel cell system having this kind of structure is able to accurately ascertain an excess in the amount of water near the oxidant gas flow path inlet and outlet using the simple method of measuring the pressure drop of oxidant gas flowing through the oxidant gas flow path.

Also, in the fuel cell system described above, a fuel gas pressure regulating valve may be provided near the fuel gas flow path outlet, and the fuel gas control apparatus may be a fuel gas pressure control apparatus that reduces the fuel gas pressure by adjusting the fuel gas pressure regulating valve.

The fuel cell system having this kind of structure is able to reduce the fuel gas pressure by the simple operation of adjusting the fuel gas pressure regulating valve.

Also, in the fuel cell system described above, the fuel gas pressure control apparatus may adjust the fuel gas pressure regulating valve to reduce the fuel gas pressure to within a range between atmospheric pressure and 0.3 MPa, inclusive.

The fuel cell system having this kind of structure is able to increase the amount of water that can be transferred through the electrolyte membrane to the oxidant gas flow path, as a result of maintaining a sufficient amount of water in the fuel gas by keeping the fuel gas pressure within a suitable range.

Also, in the fuel cell system described above, an oxidant gas supply apparatus may also be provided, and the oxidant gas control apparatus may be an oxidant gas flowrate control apparatus that reduces the oxidant gas flowrate by adjusting the oxidant gas supply apparatus.

The fuel cell system having this kind of structure is able to reduce the oxidant gas flowrate by the simple operation of adjusting the oxidant gas supply apparatus.

Also, in the fuel cell system described above, the oxidant gas flowrate control apparatus may adjust the oxidant gas supply apparatus to decrease the stoichiometric ratio of the oxidant gas to within a range between 1.0 and 3.0, inclusive.

The fuel cell system having this kind of structure is able to reduce the amount of water that can be transferred through the electrolyte membrane to the oxidant gas flow path, as a result of reducing the amount of water that is carried out of the fuel cell by the oxidant gas, by reducing the stoichiometric ratio of the oxidant gas to within a suitable range.

Also, the fuel cell system described above may also include a fuel gas supply apparatus that supplies fuel gas to the fuel cell, and the fuel gas control apparatus may be a fuel gas flowrate control apparatus that increases the fuel gas flowrate by adjusting the fuel gas supply apparatus.

The fuel cell system having this kind of structure is able to increase the fuel gas flowrate by the simple operation of adjusting the fuel gas supply apparatus.

Also, in the fuel cell system described above, the fuel gas flowrate control apparatus may adjust the fuel gas supply apparatus to increase the stoichiometric ratio of the fuel gas to within a range between 1.0 and 10, inclusive.

The fuel cell system having this kind of structure is able to increase the amount of water that can be transferred through the electrolyte membrane to the oxidant gas flow path, as a result of maintaining a sufficient amount of water in the fuel gas, and without drying out the polymer electrolyte membrane, by increasing the stoichiometric ratio of the fuel gas to within a suitable range.

Also, the fuel cell system described above may also include an oxidant gas pressure regulating valve which is arranged near the oxidant gas flow path outlet and regulates the pressure of the oxidant gas, and the oxidant gas control apparatus may be an oxidant gas pressure control apparatus that increases the oxidant gas pressure by adjusting the oxidant gas pressure regulating valve.

The fuel cell system having this kind of structure is able to increase the oxidant gas pressure by the simple operation of adjusting the oxidant gas pressure regulating valve.

Also, in the fuel cell system described above, the oxidant gas pressure control apparatus may adjust the oxidant gas pressure regulating valve to increase the oxidant gas pressure to within a range between atmospheric pressure and 0.3 MPa, inclusive.

The fuel cell system having this kind of structure is able to decrease the amount of water that can be transferred through the electrolyte membrane to the oxidant gas flow path, as a result of decreasing the amount of water that is carried out of the fuel cell by the oxidant gas, by keeping the oxidant gas pressure within a suitable range.

Also, the fuel cell system described above may include the fuel gas control apparatus; the oxidant gas control apparatus; the determining apparatus A and/or the determining apparatus C; the determining apparatus B and/or the determining apparatus D; a water transfer promoting control starting apparatus A which operates the fuel gas control apparatus one or more times after it is determined by the determining apparatus A and/or C that the amount of water near the oxidant gas flow path inlet is insufficient; a water transfer promoting control stopping apparatus A which stops the fuel gas control apparatus after it is determined by the determining apparatus A and/or C that the amount of water near the oxidant gas flow path outlet is insufficient after the water transfer promoting control starting apparatus A operates the fuel gas control apparatus; a water transfer suppressing control starting apparatus A which operates the oxidant gas control apparatus one or more times after the water transfer promoting control stopping apparatus A stops the fuel gas control apparatus; a water transfer suppressing control stopping apparatus A which stops all of the elements of the oxidant gas control apparatus after it is determined by the determining apparatus B and/or D that the amount of water near the oxidant gas flow path outlet is excessive; and an insufficient water amount final determining apparatus A. The insufficient water amount final determining apparatus A, after the water transfer suppressing control stopping apparatus A stops all of the elements of the oxidant gas control apparatus, has the water transfer promoting control starting apparatus A operate the fuel gas control apparatus again if it is determined by the determining apparatus A and/or C that the amount of water near the oxidant gas flow path inlet is insufficient, and continues to operate the fuel cell if it is determined by the determining apparatus A and/or C that the amount of water near the oxidant gas flow path inlet is not insufficient With a fuel cell system having this kind of structure, an appropriate amount of water, which is neither too much nor too little, can be maintained near the oxidant gas flow path inlet and outlet by increasing the amount of water near the oxidant gas flow path outlet using the water transfer suppressing control starting apparatus A after promoting the transfer of water from near the oxidant gas flow path outlet to near the oxidant gas flow path inlet using the water transfer promoting control starting apparatus A when it is determined that the amount of water near the oxidant gas flow path inlet is insufficient. Also, with the fuel cell system of the invention, it is possible to prevent the water in the entire oxidant gas flow path from being unevenly distributed by repeating the series of steps again based on the results from the insufficient water amount final determining apparatus A.

Also, the fuel cell system according described above may include the fuel gas control apparatus; the oxidant gas control apparatus; the determining apparatus A and/or the determining apparatus C; the determining apparatus B and/or the determining apparatus D; a water transfer suppressing control starting apparatus B which operates the oxidant gas control apparatus one or more times after it is determined by the determining apparatus A and/or C that the amount of water near the oxidant gas flow path inlet is insufficient; a water transfer suppressing control stopping apparatus B which stops the oxidant gas control apparatus after it is determined by the determining apparatus B and/or D that the amount of water near the oxidant gas flow path outlet is excessive after the water transfer suppressing control starting apparatus B operates the oxidant gas control apparatus; a water transfer promoting control starting apparatus B which operates the fuel gas control apparatus one or more times after the water transfer suppressing control stopping apparatus B stops the oxidant gas control apparatus; a water transfer promoting control stopping apparatus B which stops all of the elements of the fuel gas control apparatus after it is determined by the determining apparatus A and/or C that the amount of water near the oxidant gas flow path outlet is insufficient; and an insufficient water amount final determining apparatus B. The insufficient water amount final determining apparatus B, after the water transfer promoting control stopping apparatus B stops all of the elements of the fuel gas control apparatus, has the water transfer suppressing control starting apparatus B operate the oxidant gas control apparatus again if it is determined by the determining apparatus A and/or C that the amount of water near the oxidant gas flow path inlet is insufficient, and continues to operate the fuel cell if it is determined by the determining apparatus A and/or C that the amount of water near the oxidant gas flow path inlet is not insufficient.

With a fuel cell system having this kind of structure, an appropriate amount of water, which is neither too much nor too little, can be maintained near the oxidant gas flow path inlet and outlet by suppressing the transfer of water from near the oxidant gas flow path outlet to near the oxidant gas flow path inlet using the water transfer suppressing control starting apparatus B when it is determined that the amount of water near the oxidant gas flow path inlet is insufficient, and after a sufficient amount of water has accumulated near the oxidant gas flow path outlet, promoting the transfer of water from near the oxidant gas flow path outlet to near the oxidant gas flow path inlet using the water transfer promoting control starting apparatus B. Also, with the fuel cell system of the invention, it is possible to prevent the water in the entire oxidant gas flow path from being unevenly distributed by repeating the series of steps again based on the results from the insufficient water amount final determining apparatus B.

Also, the fuel cell system described above may include the fuel gas control apparatus; the oxidant gas control apparatus; the determining apparatus A and/or the determining apparatus C; the determining apparatus B and/or the determining apparatus D; a slightly excessive water transfer promoting control starting apparatus which operates the fuel gas control apparatus one or more times; a slightly excessive water transfer promoting control stopping apparatus which stops the fuel gas control apparatus after it is determined by the determining apparatus A and/or C that the amount of water near the oxidant gas flow path outlet is insufficient after the slightly excessive water transfer promoting control starting apparatus operates the fuel gas control apparatus; a water transfer suppressing control starting apparatus C which operates the oxidant gas control apparatus after the slightly excessive water transfer promoting control stopping apparatus stops the fuel gas control apparatus; a water transfer suppressing control stopping apparatus C which stops all of the elements of the oxidant gas control apparatus after it is determined by the determining apparatus B and/or D that the amount of water near the oxidant gas flow path outlet is excessive; a water transfer promoting control starting apparatus C which operates the fuel gas control apparatus after the water transfer suppressing control stopping apparatus C stops all of the elements of the oxidant gas control apparatus; and a water transfer promoting control stopping apparatus C. The water transfer promoting control stopping apparatus C, after the water transfer promoting control starting apparatus C operates the fuel gas control apparatus, has the water transfer suppressing control starting apparatus C operate the oxidant gas control apparatus again if it is determined by the determining apparatus A and/or C that the amount of water near the oxidant gas flow path outlet is insufficient, and stops the fuel gas control apparatus and continues to operate the fuel cell if it is determined by the determining apparatus A and/or C that the amount of water near the oxidant gas flow path outlet is not insufficient.

With a fuel cell system having this kind of structure, an appropriate amount of water, which is neither too much nor too little, can be maintained near the oxidant gas flow path inlet and outlet by first making the amount of water near the oxidant gas flow path outlet appropriately insufficient using the slightly excessive water transfer promoting control starting apparatus, then suppressing the transfer of water from near the oxidant gas flow path outlet to near the oxidant gas flow path inlet using the water transfer suppressing control starting apparatus C, and after a sufficient amount of water has accumulated near the oxidant gas flow path outlet, promoting the transfer of water from near the oxidant gas flow path outlet to near the oxidant gas flow path inlet using the water transfer promoting control starting apparatus C. Also, the fuel cell system of the invention is particularly effective when it includes a fuel cell that has a catalyst layer that is unable to maintain its original performance once it has gotten wet (such as a catalyst layer in which tiny pores in the catalyst layer are blocked by intentionally oxidizing the catalyst), because it does not give the catalyst layer a wet history.

Also, the fuel cell system described above may include the fuel gas control apparatus; the oxidant gas control apparatus; the determining apparatus A and/or the determining apparatus C; the determining apparatus B and/or the determining apparatus D; a slightly excessive water transfer suppressing control starting apparatus which operates the oxidant gas control apparatus one or more times; a slightly excessive water transfer suppressing control stopping apparatus which stops the oxidant gas control apparatus after it is determined by the determining apparatus B and/or D that the amount of water near the oxidant gas flow path outlet is excessive after the slightly excessive water transfer suppressing control starting apparatus operates the oxidant gas control apparatus; a water transfer promoting control starting apparatus D which operates the fuel gas control apparatus after the slightly excessive water transfer suppressing control stopping apparatus stops the oxidant gas control apparatus; a water transfer promoting control stopping apparatus D which stops all of the elements of the fuel gas control apparatus after it is determined by the determining apparatus A and/or C that the amount of water near the oxidant gas flow path outlet is insufficient; a water transfer suppressing control starting apparatus D which operates the oxidant gas control apparatus after the water transfer promoting control stopping apparatus D stops all of the elements of the fuel gas control apparatus; and a water transfer suppressing control stopping apparatus D. The water transfer suppressing control stopping apparatus D, after the water transfer suppressing control starting apparatus D operates the oxidant gas control apparatus, has the water transfer promoting control starting apparatus D operate the fuel gas control apparatus again if it is determined by the determining apparatus B and/or D that the amount of water near the oxidant gas flow path outlet is excessive, and stops the oxidant gas control apparatus and continues to operate the fuel cell if it is determined by the determining apparatus B and/or D that the amount of water near the oxidant gas flow path outlet is not excessive.

With a fuel cell system having this kind of structure, an appropriate amount of water, which is neither too much nor too little, can be maintained near the oxidant gas flow path inlet and outlet by first making the amount of water near the oxidant gas flow path outlet appropriately excessive using the slightly excessive water transfer suppressing control starting apparatus, then promoting the transfer of water from near the oxidant gas flow path outlet to near the oxidant gas flow path inlet using the water transfer promoting control starting apparatus D, and then increasing the amount of water near the oxidant gas flow path outlet using the water transfer suppressing control starting apparatus D. Also, the fuel cell system of the invention is particularly effective when it includes a fuel cell that has an electrolyte membrane that is unable to maintain its original performance once it has been dry (such as perfluorocarbon sulfonate electrolyte membrane), because it does not give the electrolyte membrane a dry history.

Another aspect of the invention relates to an operating method of a fuel cell having a stack that has a single cell that includes a membrane electrode assembly in which a polymer electrolyte membrane is sandwiched between a pair of electrodes, an oxidant gas flow path provided on one side of the membrane electrode assembly, and a fuel gas flow path provided on the other side of the membrane electrode assembly, the fuel gas flow path and the oxidant gas flow path being arranged such that fuel gas and oxidant gas flow in opposite directions. This operating method of a fuel cell includes determining whether the amount of water near the oxidant gas flow path inlet is insufficient under at least one of the conditions that i) there be no humidity or the temperature of the membrane electrode assembly be at least 70° C.; and increasing the amount of water near the oxidant gas flow path inlet by increasing the fuel gas flowrate and/or reducing the fuel gas pressure if it is determined that the amount of water near the oxidant gas flow path inlet is insufficient.

With an operating method of a fuel cell having this kind of structure, a greater amount of water can be transferred from near the fuel gas flow path outlet to near the oxidant gas flow path inlet through the polymer electrolyte membrane by transferring a greater amount of water in the fuel gas to near the fuel gas flow path outlet after water near the oxidant gas flow path outlet has been transferred to near the fuel gas flow path inlet through the polymer electrolyte membrane. Accordingly, it is possible to adjust the amount of water near the oxidant gas flow path inlet which tends to become dry in the related art, as well as near the oxidant gas flow path outlet which tends to become wet in the related art. As a result, operation of a fuel cell that prevents water from becoming unevenly distributed on the surface of the single cell while under a non-humid condition and/or a high temperature condition can be realized.

The operating method of a fuel cell described above may also include determining whether the amount of water near the oxidant gas flow path outlet is excessive; increasing the amount of water near the oxidant gas flow path inlet and decreasing the amount of water near the oxidant gas flow path outlet by promoting the transfer of water near the oxidant gas flow path outlet to near the oxidant gas flow path inlet via the fuel gas flow path by increasing the fuel gas flowrate and/or reducing the fuel gas pressure if it is determined that the amount of water near the oxidant gas flow path inlet is insufficient and/or that the amount of water near the oxidant gas flow path outlet is excessive; determining whether the amount of water near the oxidant gas flow path inlet is excessive under at least one of the conditions that i) there be no humidity or ii) the temperature of the membrane electrode assembly be at least 70° C.; determining whether the amount of water near the oxidant gas flow path outlet is insufficient; and decreasing the amount of water that is carried out of the cell by the oxidant gas and increasing the amount of water that can be transferred from the oxidant gas flow path outlet side to the fuel gas flow path inlet side by decreasing the oxidant gas flowrate and/or increasing the oxidant gas pressure if it is determined that the amount of water near the oxidant gas flow path inlet and/or the oxidant gas flow path outlet is insufficient.

With an operating method of a fuel cell having this kind of structure, a greater amount of water can be transferred from near the fuel gas flow path outlet to near the oxidant gas flow path inlet through the polymer electrolyte membrane by transferring a greater amount of water in the fuel gas to near the fuel gas flow path outlet after water near the oxidant gas flow path outlet has been transferred to near the fuel gas flow path inlet through the polymer electrolyte membrane. Accordingly, it is possible to adjust the amount of water near the oxidant gas flow path inlet which tends to become dry in the related art, as well as near the oxidant gas flow path outlet which tends to become wet in the related art. As a result, operation of a fuel cell that prevents water from becoming unevenly distributed on the surface of the single cell while under a non-humid condition and/or a high temperature condition can be realized. Also, with the fuel cell system of the invention, water can be accumulated near the oxidant gas flow path outlet by keeping down the amount of water that is carried away by the oxidant gas and discharged outside the fuel cell.

Also, the operating method of a fuel cell described above may also include measuring a resistance value of the overall fuel cell; and determining that the amount of water near the oxidant gas flow path inlet is insufficient and/or that the amount of water near the oxidant gas flow path outlet is insufficient, when the resistance value exceeds 105% of a minimum value of the premeasured resistance of the single cell and/or the stack at each of a plurality of temperatures.

The operating method of a fuel cell having this kind of structure is able to accurately ascertain an insufficiency in the amount of water near the oxidant gas flow path inlet and outlet using the simple method of measuring the resistance value of the overall fuel cell.

Also, the operating method of a fuel cell described above may also include measuring a voltage of the overall fuel cell; and determining that the amount of water near the oxidant gas flow path inlet is excessive and/or that the amount of water near the oxidant gas flow path outlet is excessive, when the voltage is less than 95% of a maximum value of the premeasured voltage of the single cell and/or the stack at each of a plurality of temperatures.

The operating method of a fuel cell having this kind of structure is able to accurately ascertain an excess in the amount of water near the oxidant gas flow path inlet and outlet using the simple method of measuring the voltage of the overall fuel cell.

Also, the operating method of a fuel cell described above may also include measuring a pressure drop of oxidant gas flowing through the oxidant gas flow path; and determining that the amount of water near the oxidant gas flow path inlet is insufficient and/or that the amount of water near the oxidant gas flow path outlet is insufficient, when the pressure drop is less than 105% of a minimum value of the premeasured pressure drop of oxidant gas flowing through the oxidant gas flow path.

The operating method of a fuel cell having this kind of structure is able to accurately ascertain an insufficiency in the amount of water near the oxidant gas flow path inlet and outlet using the simple method of measuring the pressure drop of oxidant gas flowing through the oxidant gas flow path.

Also, the operating method of a fuel cell described above may also include measuring a pressure drop of oxidant gas flowing through the oxidant gas flow path; and determining that the amount of water near the oxidant gas flow path inlet is excessive and/or that the amount of water near the oxidant gas flow path outlet is excessive, when the pressure drop exceeds 105% of a maximum value of the premeasured pressure drop of oxidant gas flowing through the oxidant gas flow path.

The operating method of a fuel cell having this kind of structure is able to accurately ascertain an excess in the amount of water near the oxidant gas flow path inlet and outlet using the simple method of measuring the pressure drop of oxidant gas flowing through the oxidant gas flow path.

Also, in the operating method of a fuel cell described above, the fuel gas pressure may be reduced to within a range between atmospheric pressure and 0.3 MPa, inclusive.

The operating method of a fuel cell having this kind of structure is able to increase the amount of water near the oxidant gas flow path inlet and decrease the amount of water near the oxidant gas flow path outlet, as a result of maintaining a sufficient amount of water in the fuel gas by reducing the fuel gas pressure to within a suitable range.

Also, in the operating method of a fuel cell described above, the stoichiometric ratio of the oxidant gas may be decreased to within a range between 1.0 and 3.0, inclusive.

The operating method of a fuel cell having this kind of structure is able to decrease the amount of water near the oxidant gas flow path inlet and increase the amount of water near the oxidant gas flow path outlet, as a result of reducing the amount of water that is carried out of the fuel cell by the oxidant gas, by reducing the stoichiometric ratio of the oxidant gas to within a suitable range.

Also, in the operating method of a fuel cell described above, the stoichiometric ratio of the fuel gas may be increased to within a range between 1.0 and 10, inclusive.

The operating method of a fuel cell having this kind of structure is able to increase the amount of water near the oxidant gas flow path inlet and decrease the amount of water near the oxidant gas flow path outlet, without drying out the polymer electrolyte membrane, by increasing the stoichiometric ratio of the fuel gas to within a suitable range.

Also, in the operating method of a fuel cell described above, the oxidant gas pressure may be increased to within a range between atmospheric pressure and 0.3 MPa, inclusive.

The operating method of a fuel cell having this kind of structure is able to decrease the amount of water near the oxidant gas flow path inlet and increase the amount of water near the oxidant gas flow path outlet, as a result of reducing the amount of water that is carried out of the fuel cell by the oxidant gas, by increasing the oxidant gas pressure to within a suitable range.

Also, the operating method of a fuel cell described above may also include increasing the stoichiometric ratio of the fuel gas to within a range between 1.0 and 10, inclusive, and/or reducing the fuel gas pressure to within a range between atmospheric pressure and 0.3 MPa, inclusive, one or more times if it is determined that the amount of water near the oxidant gas flow path inlet is insufficient; then stopping controlling the fuel gas after it is determined that the amount of water near the oxidant gas flow path outlet is insufficient; then decreasing the stoichiometric ratio of the oxidant gas to within a range between 1.0 and 3.0, inclusive, and/or increasing the oxidant gas pressure to within a range between atmospheric pressure and 0.3 MPa, inclusive, one or more times; then stopping controlling the oxidant gas after it is determined that the amount of water near the oxidant gas flow path outlet is excessive; and then starting controlling the fuel gas again if it is determined that the amount of water near the oxidant gas flow path inlet is insufficient, and continuing operation of the fuel cell if it is determined that the amount of water near the oxidant gas flow path inlet is not insufficient.

With an operating method of a fuel cell having this kind of structure, an appropriate amount of water, which is neither too much nor too little, can be maintained near the oxidant gas flow path inlet and outlet by increasing the amount of water near the oxidant gas flow path outlet by controlling the oxidant gas after promoting the transfer of water from near the oxidant gas flow path outlet to near the oxidant gas flow path inlet by controlling the fuel gas when it is determined that the amount of water near the oxidant gas flow path inlet is insufficient. Also, with the operating method of a fuel cell of the invention, it is possible to prevent the water in the entire oxidant gas flow path from being unevenly distributed by making a final determination as to whether the amount of water near the oxidant gas flow path inlet is insufficient, and repeating the series of steps again if that amount of water is insufficient.

Also, the operating method of a fuel cell described above may also include decreasing the stoichiometric ratio of the oxidant gas to within a range between 1.0 and 3.0, inclusive, and/or increasing the oxidant gas pressure to within a range between atmospheric pressure and 0.3 MPa, inclusive, one or more times if it is determined that the amount of water near the oxidant gas flow path inlet is insufficient; then stopping controlling the oxidant gas after it is determined that the amount of water near the oxidant gas flow path outlet is excessive; then increasing the stoichiometric ratio of the fuel gas to within a range between 1.0 and 10, inclusive, and/or reducing the fuel gas pressure to within a range between atmospheric pressure and 0.3 MPa, inclusive, one or more times; then stopping controlling the fuel gas after it is determined that the amount of water near the oxidant gas flow path outlet is insufficient; and then starting controlling the oxidant gas again if it is determined that the amount of water near the oxidant gas flow path inlet is insufficient, and continuing operation of the fuel cell if it is determined that the amount of water near the oxidant gas flow path inlet is not insufficient.

With an operating method of a fuel cell having this kind of structure, an appropriate amount of water, which is neither too much nor too little, can be maintained near the oxidant gas flow path inlet and outlet by suppressing the transfer of water from near the oxidant gas flow path outlet to near the oxidant gas flow path inlet by controlling the oxidant gas when it is determined that the amount of water near the oxidant gas flow path inlet is insufficient, and after a sufficient amount of water has accumulated near the oxidant gas flow path outlet, promoting the transfer of water from near the oxidant gas flow path outlet to near the oxidant gas flow path inlet by controlling the fuel gas. Also, with the operating method of a fuel cell of the invention, it is possible to prevent the water in the entire oxidant gas flow path from being unevenly distributed by making a final determination as to whether the amount of water near the oxidant gas flow path inlet is insufficient, and repeating the series of steps again if that amount of water is insufficient.

Also, the operating method of a fuel cell described above may also include increasing the stoichiometric ratio of the fuel gas to within a range between 1.0 and 10, inclusive, and/or reducing the fuel gas pressure to within a range between atmospheric pressure and 0.3 MPa, inclusive, one or more times; then stopping controlling the fuel gas after it is determined that the amount of water near the oxidant gas flow path outlet is insufficient; then decreasing the stoichiometric ratio of the oxidant gas to within a range between 1.0 and 3.0, inclusive, and/or increasing the oxidant gas pressure to within a range between atmospheric pressure and 0.3 MPa, inclusive, one or more times; then stopping controlling the oxidant gas after it is determined that the amount of water near the oxidant gas flow path outlet is excessive; then increasing the stoichiometric ratio of the fuel gas to within a range between 1.0 and 10, inclusive, and/or reducing the fuel gas pressure to within a range between atmospheric pressure and 0.3 MPa, inclusive; and then starting controlling the oxidant gas again if it is determined that the amount of water near the oxidant gas flow path outlet is insufficient, and stopping controlling the fuel gas and continuing to operate the fuel cell if it is determined that the amount of water near the oxidant gas flow path outlet is not insufficient.

With an operating method of a fuel cell having this kind of structure, an appropriate amount of water, which is neither too much nor too little, can be maintained near the oxidant gas flow path inlet and outlet by first making the amount of water near the oxidant gas flow path outlet appropriately insufficient by controlling the fuel gas, then suppressing the transfer of water from near the oxidant gas flow path outlet to near the oxidant gas flow path inlet by controlling the oxidant gas, and after a sufficient amount of water has accumulated near the oxidant gas flow path outlet, promoting the transfer of water from near the oxidant gas flow path outlet to near the oxidant gas flow path inlet by controlling the fuel gas. Also, the operating method of a fuel cell of the invention is particularly effective when operating a fuel cell that has a catalyst layer that is unable to maintain its original performance once it has gotten wet (such as a catalyst layer in which tiny pores in the catalyst layer are blocked by intentionally oxidizing the catalyst), because it does not give the catalyst layer a wet history.

Also, the operating method of a fuel cell described above may also include decreasing the stoichiometric ratio of the oxidant gas to within a range between 1.0 and 3.0, inclusive, and/or increasing the oxidant gas pressure to within a range between atmospheric pressure and 0.3 MPa, inclusive, one or more times; then stopping controlling the oxidant gas after it is determined that the amount of water near the oxidant gas flow path outlet is excessive; then increasing the stoichiometric ratio of the fuel gas to within a range between 1.0 and 10, inclusive, and/or reducing the fuel gas pressure to within a range between atmospheric pressure and 0.3 MPa, inclusive, one or more times; then stopping controlling the fuel gas after it is determined that the amount of water near the oxidant gas flow path outlet is insufficient; then decreasing the stoichiometric ratio of the oxidant gas to within a range between 1.0 and 3.0, inclusive, and/or increasing the oxidant gas pressure to within a range between atmospheric pressure and 0.3 MPa, inclusive; and then starting controlling the fuel gas again if it is determined that the amount of water near the oxidant gas flow path outlet is excessive, and stopping controlling the oxidant gas and continuing to operate the fuel cell if it is determined that the amount of water is not excessive.

With an operating method of a fuel cell having this kind of structure, an appropriate amount of water, which is neither too much nor too little, can be maintained near the oxidant gas flow path inlet and outlet by first making the amount of water near the oxidant gas flow path outlet appropriately excessive by controlling the oxidant gas, then promoting the transfer of water from near the oxidant gas flow path outlet to near the oxidant gas flow path inlet by controlling the fuel gas, and then increasing the amount of water near the oxidant gas flow path outlet by controlling the oxidant gas. Also, the operating method of a fuel cell of the invention is particularly effective when operating a fuel cell that has an electrolyte membrane that is unable to maintain its original performance once it has been dry (such as perfluorocarbon sulfonate electrolyte membrane), because it does not give the electrolyte membrane a dry history.

According to the invention, a greater amount of water can be transferred from near the fuel gas flow path outlet to near the oxidant gas flow path inlet through the polymer electrolyte membrane by transferring a greater amount of water in the fuel gas to near the fuel gas flow path outlet after water near the oxidant gas flow path outlet has been transferred to near the fuel gas flow path inlet through the polymer electrolyte membrane. Accordingly, it is possible to adjust the amount of water near the oxidant gas flow path inlet which tends to become dry in the related art, as well as near the oxidant gas flow path outlet which tends to become wet in the related art. As a result, it is possible to prevent water from becoming unevenly distributed on the surface of the single cell while under a non-humid condition and/or a high temperature condition. Also, the fuel cell system of the invention has the determining apparatus so it is possible to accurately ascertain an insufficiency in the amount of water near the oxidant gas flow path inlet.

BRIEF DESCRIPTION OF THE DRAWINGS

The features, advantages, and technical and industrial significance of this invention will be described in the following detailed description of example embodiments of the invention with reference to the accompanying drawings, in which like numerals denote like elements, and wherein.

DETAILED DESCRIPTION OF EMBODIMENTS

Figure 1:
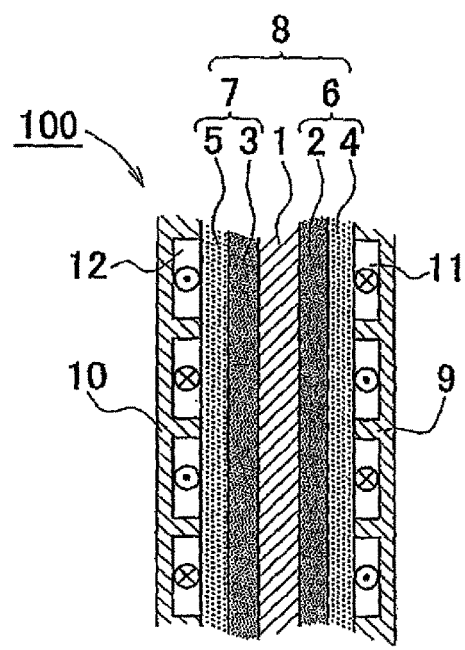
FIG. 1 is a sectional view showing a frame format of a single cell, which has been cut in the stacking direction, in a fuel cell system of the invention.

An operating method of a fuel cell of the invention is a method for operating a fuel cell that has a stack that includes a single cell which is provided with i) a membrane electrode assembly in which a solid polymer electrolyte membrane is sandwiched between a pair of electrodes, ii) an oxidant gas flow path provided on one side of the membrane electrode assembly, and iii) a fuel gas flow path provided on the other side of the membrane electrode assembly. The fuel gas flow path and the oxidant gas flow path are arranged such that the fuel gas and the oxidant gas flow in opposite directions. If it is determined, under at least one of the conditions that i) there be no humidity or ii) the temperature of the membrane electrode assembly be at least 70° C., that the amount of water near the oxidant gas flow path inlet is insufficient, then the amount of water near the oxidant gas flow path inlet is increased by increasing the fuel gas flowrate and/or reducing the fuel gas pressure.

The preferable fuel cell system of the invention for carrying out this operating method of a fuel cell is a fuel cell system which includes a fuel cell having a stack that has a single cell which has a membrane electrode assembly in which a solid polymer electrolyte membrane is sandwiched between a pair of electrodes. Fuel gas and oxidant gas are supplied to the fuel cell. The fuel cell system operates under at least one the conditions that i) there be no humidity or ii) the temperature of the membrane electrode assembly be at least 70° C. The fuel cell has a fuel gas flow path on one side of the membrane electrode assembly and an oxidant gas flow path on the other side of the membrane electrode assembly. The fuel gas flow path and the oxidant gas flow path are arranged such that the fuel gas and the oxidant gas flow in opposite directions. In addition, the fuel cell system is provided with a determining apparatus that determines the amount of water near the oxidant gas flow path inlet, and a fuel gas control apparatus that increases the amount of water near the oxidant gas flow path inlet by increasing the fuel gas flowrate and/or reducing the fuel gas pressure if it is determined in the determining apparatus that the amount of water near the oxidant gas flow path inlet is insufficient.

An operating method of a fuel cell of the invention is a method for operating a fuel cell that has a stack that includes a single cell which is provided with i) a membrane electrode assembly in which a solid polymer electrolyte membrane is sandwiched between a pair of electrodes, ii) an oxidant gas flow path provided on one side of the membrane electrode assembly, and iii) a fuel gas flow path provided on the other side of the membrane electrode assembly. The fuel gas flow path and the oxidant gas flow path are arranged such that the fuel gas and the oxidant gas flow in opposite directions. If it is determined, under at least one of the conditions that i) there be no humidity or ii) the temperature of the membrane electrode assembly be at least 70° C., that the amount of water near the oxidant gas flow path inlet is insufficient and/or that the amount of water near the oxidant gas flow path outlet is excessive, then the amount of water near the oxidant gas flow path inlet is preferably increased and the amount of water near the oxidant gas flow path outlet is preferably decreased by promoting the transfer of the amount of water near the oxidant gas flow path outlet to near the oxidant gas flow path inlet via the fuel gas flow path by increasing the fuel gas flowrate and/or reducing the fuel gas pressure. Also, if it is determined, under at least one of the conditions that i) there be no humidity or ii) the temperature of the membrane electrode assembly be at least 70° C., that the amount of water near the oxidant gas flow path inlet and/or the oxidant gas flow path outlet is insufficient, then the amount of water that is carried out of the cell by the oxidant gas is preferably decreased and the amount of water that can be transferred from the oxidant gas flow path outlet side to the fuel gas flow path inlet side is preferably increased by decreasing the oxidant gas flowrate and/or increasing the oxidant gas pressure.

The preferable fuel cell system of the invention for carrying out this operating method of a fuel cell is a fuel cell system which includes a fuel cell having a stack that has a single cell which has a membrane electrode assembly in which a solid polymer electrolyte membrane is sandwiched between a pair of electrodes. Fuel gas and oxidant gas are supplied to the fuel cell. The fuel cell system operates under at least one the conditions that i) there be no humidity or ii) the temperature of the membrane electrode assembly be at least 70° C. The fuel cell has a fuel gas flow path on one side of the membrane electrode assembly and an oxidant gas flow path on the other side of the membrane electrode assembly. The fuel gas flow path and the oxidant gas flow path are arranged such that the fuel gas and the oxidant gas flow in opposite directions. In addition, the fuel cell system is provided with a determining apparatus and at least one of a fuel gas control apparatus or an oxidant gas control apparatus. The determining apparatus determines the amount of water near the oxidant gas flow path inlet and/or near the oxidant gas flow path outlet. The fuel gas control apparatus increases the amount of water near the oxidant gas flow path inlet and decreases the amount of water near the oxidant gas flow path outlet by promoting the transfer of water near the oxidant gas flow path outlet to near the oxidant gas flow path inlet via the fuel gas flow path by increasing the fuel gas flowrate and/or reducing the fuel gas pressure if it is determined in the determining apparatus that the amount of water near the oxidant gas flow path inlet is insufficient and/or that the amount of water near the oxidant gas flow path outlet is excessive. The oxidant gas control apparatus decreases the amount of water that is carried out of the cell by the oxidant gas and increases the amount of water that can be transferred from the oxidant gas flow path outlet side to the fuel gas flow path inlet side by decreasing the oxidant gas flowrate and/or increasing the oxidant gas pressure if it is determined in the determining apparatus that the amount of water near the oxidant gas flow path inlet and/or the oxidant gas flow path outlet is insufficient.

Here, the solid polymer electrolyte membrane is a solid polymer electrolyte membrane used in a fuel cell. Examples include a fluorine polymer electrolyte membrane including fluorine polymer electrolyte such as perfluorocarbon sulfonate resin represented by NAFION (trade name), as well as a hydrocarbon polymer electrolyte membrane including a hydrocarbon polymer electrolyte in which a proton acid group (i.e., proton conducting group) such as a sulfonic acid group, a carboxylic acid group, or a phosphate group is introduced into a hydrocarbon polymer such as a general purpose plastic, and plastics such as polyether ether ketone, polyether ketone, polyether sulfone, polyphenylene sulfide, polyphenylene ethyl, or polyparaphenylene.

The electrodes each have catalyst layer and a gas diffusion layer. The catalyst layer can be formed using a catalyst ink containing a catalyst, conductive material, and a polymer electrolyte. The catalyst is normally a catalytic component carried on conducting particles. The catalytic component is not particularly limited as long as it has catalytic properties with respect to an oxidation reaction of fuel at a fuel electrode or a reduction reaction of the oxidant at the oxidant electrode. The catalytic component that is generally used in polymer electrolyte fuel cells may be used. For example, platinum or an alloy of platinum and a metal such as ruthenium, iron, nickel, manganese, cobalt, or copper may be used.

The conducting particles which serve as the catalyst carrier may be conductive carbon material like carbon fiber or carbon particles such as carbon black, or metallic material such as metal particles or metal fiber. The conductive material also serves to give conductivity to the catalyst layer.

The catalytic ink is obtained by dissolving or dispersing the catalyst and polymer electrolyte such as those described above in a solvent. The polymer electrolyte is a polymer electrolyte used in a fuel cell. Specific examples include a fluorine polymer electrolyte and a hydrocarbon polymer electrolyte such as those used in the solid polymer electrolyte membrane described above. The solvent of the catalytic ink may be selected as appropriate. For example, an organic solvent such as N-methyl-2-pyrrolidone (NMP), dimethyl sulfoxide (DMSO), or alcohol such as methanol, ethanol, or propanol, or a mixture of these organic solvents, or a mixture of these organic solvents and water, may be used. The catalytic ink may also include other components aside from the catalyst and the electrolyte, such as a binding agent or a water-shedding resin when necessary.

The methods for applying and drying the catalytic ink may be selected as appropriate. For example, examples of application methods include spraying, screen printing, the doctor blade method, gravure printing, and die coating and the like. Also, examples of drying methods include reduced-pressure drying, heat drying, and heat drying at a reduced pressure. The specific conditions for reduced-pressure drying and heat drying are not limited and may be set appropriately. The amount of catalytic ink applied differs depending on the composition of the catalytic ink and the catalyst performance of the catalyst metal used for the electrode catalyst, but it is sufficient that the amount of catalytic component per unit area be approximately 0.01 to 2.0 mg/cm$^2$. Also, the thickness of the catalyst layer is not particularly limited, but approximately 1 to 50 µm is sufficient.

The forming method of the catalyst layer is not particularly limited. For example, a catalyst layer may be formed on the surface of a gas diffusion layer sheet by applying and drying catalytic ink onto the surface of the gas diffusion layer sheet. Alternatively, a catalyst layer may be formed on the surface of an electrolyte membrane by applying and drying catalytic ink onto the surface of the electrolyte membrane. Alternatively, a catalyst layer may be formed on the surface of an electrolyte membrane or a gas diffusion sheet by first making a transfer sheet by applying and drying catalytic ink onto the surface of a transfer substrate, then bonding this transfer sheet by thermo compression bonding or the like with an electrolyte membrane or a gas diffusion sheet, and then peeling off the substrate film of the transfer sheet.

A gas diffusion layer sheet that forms the gas diffusion layer has conductivity and gas diffusibility that enables gas to be efficiently supplied to the catalyst layer and has the required strength of material that forms a gas diffusion layer. For example, the gas diffusion layer sheet may be formed of a conductive porous body such as a carbonaceous porous body such as carbon paper, carbon cross, or carbon felt, or a metal porous body or metal mesh formed from metal such as titanium, aluminum, copper, nickel, a nickel-chrome alloy, a copper alloy, silver, an aluminum alloy, a zinc alloy, a lead alloy, niobium, tantalum, iron, stainless steel, gold, or platinum. The thickness of the conductive porous body is preferably approximately 50 to 500 μm.

The gas diffusion layer sheet may be made from a single layer of a conductive porous body as described above, but a water-shedding layer may also be provided on the side facing the catalyst layer. The water-shedding layer normally has a porous structure and includes water-shedding resin and the like such as polytetrafluoroethylene (PTFE) and conducting particulates such as carbon particles and carbon fiber. The water-shedding layer is not always necessary but it is advantageous in that it can improve the electrical contact between catalyst layer and the gas diffusion layer in addition to improving the water repellency of the gas diffusion layer while adequately retaining the amount of water in the catalyst layer and the electrolyte membrane.

The manufactured membrane electrode assembly is then sandwiched by separators to form a single cell. The separators has conductive and gas sealing properties and is able to function as a collector and a gas seal. For example, a carbon separator having a high carbon fiber content and formed of a composite with resin, or a metal separator that uses metal material may be used. Examples of metal separators include a metal separator made from metal material that is highly corrosion resistant, and a metal separator of which the surface has been coated with carbon or a highly corrosion resistant metal material or the like to increase corrosion resistance. A flow path for supplying fuel gas and oxidant gas is formed in the separators.

A gas used in an anode electrode of a typical fuel cell, more specifically, hydrogen gas, may be used as the fuel gas that can be used in the fuel cell system or operating method of a fuel cell of the invention. A gas that is used in a cathode electrode of a typical fuel cell, more specifically, oxygen gas, may be used as the oxidant gas that can be used in the fuel cell system or operating method of a fuel cell of the invention.

FIG. 1 is a sectional view of showing a frame format of an example of the single cell described above, which has been cut in the stacking direction. As shown in the drawing, the single cell 100 of the fuel cell in the fuel cell system of the invention has a membrane electrode assembly 8 in which a polymer electrolyte membrane 1 is sandwiched between a cathode electrode 6 and an anode electrode 7. The single cell 100 also has a pair of separators 9 and 10 that sandwich the membrane electrode assembly 8 from the outside of the electrodes. An oxidant gas flow path 11 is ensured on the cathode electrode 6 side at the boundary of the separator and the electrode, and a fuel gas flow path 12 is ensured on the anode electrode side 7 at the boundary of the separator and the electrode. The cathode electrode is formed of a cathode catalyst layer 2 and a gas diffusion layer 4 stacked together. The anode electrode 7 is formed of an anode catalyst layer 3 and a gas diffusion layer 5 stacked together. Further, the oxidant gas flow path 11 and the fuel gas flow path 12 are arranged such that the fuel gas and the oxidant gas flow in opposite directions. Here, the symbol of a circle with a dot in the center in the flow paths 11 and 12 in FIG. 1 indicates that the gas is flowing in a direction perpendicular to the paper on which the drawing is drawn, and toward the person viewing the drawing. The symbol of a circle with an X in the center indicates that the gas is flowing in perpendicular to the paper on which the drawing is drawn, and away from the person viewing the drawing. Further, although not specifically indicated, the area near the inlet of the oxidant gas flow path 11 is on the opposite side of the electrolyte membrane 1 from the area near the outlet of the fuel gas flow path 12, and the area near the outlet of the oxidant gas flow path 11 is on the opposite side of the electrolyte membrane 1 from the area near the inlet of the fuel gas flow path 12. Incidentally, in FIG. 1, the gas flow paths are drawn as S-shaped flow paths but the gas flow paths are not to any particular shape. That is, they may be any shape as long as the fuel gas and the oxidant gas flow in opposite directions.

An example of a method for determining the amount of water near the oxidant gas flow path inlet and outlet may be measuring the resistance value of the overall fuel cell and determining that the inside of a single cell or the stack is dry when that resistance value is equal to or greater than a minimum value of the premeasured resistance of at least one of the single cell or the stack at each of a plurality of temperatures. The reason for having the place for determining the amount of water be near the oxidant gas flow path inlet is because in a fuel cell mounted in a vehicle, for example, typically air is used as the oxidant gas and hydrogen gas is used as the fuel gas, and the gas flowrate at a given stoichiometric ratio is such that there is more air than hydrogen gas so it can be assumed that the single cell or stack will start to dry out at the oxidant gas flow path inlet first. The reason for having the place for determining the amount of water be near the oxidant gas flow path outlet is because it is thought that there may be a temporary insufficiency in the amount of water near the oxidant gas flow path outlet after a fuel gas control apparatus, such as that which will be described later, for example, is operated.

The determining apparatus can be structured to measure the resistance value of the overall fuel cell and determine i) whether the amount of water near the oxidant gas flow path inlet is insufficient and/or ii) whether the amount of water near the oxidant gas flow path outlet is insufficient when the resistance value is a value exceeding 105% of the minimum value of the premeasured resistance of at least one of the single cell or the stack at each of the temperatures (this kind of determining apparatus will hereinafter be referred to as determining apparatus A). This is because insufficiencies in the amount of water near the oxidant gas flow path inlet and outlet can be accurately ascertained by the simple method of measuring the resistance value of the overall fuel cell. Incidentally, it is more preferable to determine that the amount of water is insufficient when the resistance value of the overall fuel cell is a value exceeding 110% of the minimum value of the premeasured resistance of at least one of the single cell or the stack at each of the temperatures, and even more preferable to determine that the amount of water is insufficient when the resistance value of the overall fuel cell is a value exceeding 120% of the minimum value of the premeasured resistance of at least one of the single cell or the stack at each of the temperatures.

Also, one example of a method for determining the amount of water near the oxidant gas flow path inlet and outlet is to measure the pressure drop of the oxidant gas flowing through the oxidant gas flow path, and determine that the inside of the single cell or the stack is dry when the pressure drop is equal to or less than the premeasured pressure drop of oxidant gas flowing through the oxidant gas flow path.

The determining apparatus may be structured to measure the pressure drop of the oxidant gas flowing through the oxidant gas flow path, and determine i) whether the amount of water near the oxidant gas flow path inlet is insufficient and/or ii) whether the amount of water near the oxidant gas flow path outlet is insufficient when the pressure drop is below 105% of a minimum value of the premeasured pressure drop of oxidant gas flowing through the oxidant gas flow path (this kind of determining apparatus will hereinafter be referred to as determining apparatus C). This is because insufficiencies in the amount of water near the oxidant gas flow path inlet and outlet can be accurately ascertained by the simple method of measuring the pressure drop of the oxidant gas flowing through the oxidant gas flow path. Incidentally, it is more preferable to determine that the amount of water is insufficient when the pressure drop of the oxidant gas flowing through the oxidant gas flow path is below 100% of the minimum value of the premeasured pressure drop of oxidant gas flowing through the oxidant gas flow path, and even more preferable to determine that the amount of water is insufficient when the pressure drop of the oxidant gas flowing through the oxidant gas flow path is below 95% of the minimum value of the premeasured pressure drop of oxidant gas flowing through the oxidant gas flow path.

Also, one example of a method for measuring the amount of water near the oxidant gas flow path inlet and outlet is to measure the voltage of the overall fuel cell and determine that there is excess water in a single cell or in the stack when the voltage is equal to or less than a minimum value of the premeasured voltage of at least one of the single cell or the stack at each of a plurality of temperatures.

The determining apparatus may be structured to measure the voltage of the overall fuel cell and determined i) whether the amount of water near the oxidant gas flow path inlet is excessive and/or ii) whether the amount of water near the oxidant gas flow path outlet is excessive when the voltage is below 95% of the maximum value of the premeasured voltage at least one of a single cell or the stack at each of a plurality of temperatures (this kind of determining apparatus will hereinafter be referred to as determining apparatus B). This is because excessive amount of water near the oxidant gas flow path inlet and outlet can be accurately ascertained by the simple method of measuring the voltage of the overall fuel cell. Incidentally, it is more preferable to determine that the amount of water is excessive when the voltage of the overall fuel cell is below 90% of the minimum value of the premeasured voltage of at least one of a single cell or the stack at each of a plurality of temperatures, and even more preferable to determine that the amount of water is excessive when the voltage of the overall fuel cell is below 85% of the minimum value of the premeasured voltage of at least one of a single cell or the stack at each of a plurality of temperatures.

Also, one example of a method for measuring the amount of water near the oxidant gas flow path inlet and outlet is to measure the pressure drop of the oxidant gas flowing through the oxidant gas flow path and determine that there is excess water in a single cell or in the stack when the pressure drop is equal to or greater than the premeasured pressure drop of oxidant gas flowing through the oxidant gas flow path.

The determining apparatus may be structured to measure the pressure drop of the oxidant gas flowing through the oxidant gas flow path, and determine whether the amount of water near the oxidant gas flow path inlet is excessive and/or whether the amount of water near the oxidant gas flow path outlet is excessive when the pressure drop is a value exceeding 105% of a maximum value of the premeasured pressure drop of oxidant gas flowing through the oxidant gas flow path (this kind of determining apparatus will hereinafter be referred to as determining apparatus D). This is because excessive amount of water near the oxidant gas flow path inlet and outlet can be accurately ascertained by the simple method of measuring the pressure drop of the oxidant gas flowing through the oxidant gas flow path. Incidentally, it is more preferable to determine that the amount of water is excessive when the pressure drop of the oxidant gas flowing through the oxidant gas flow path is a value exceeding 110% of the maximum value of the premeasured pressure drop of oxidant gas flowing through the oxidant gas flow path, and even more preferable to determine that the amount of water is excessive when the pressure drop of the oxidant gas flowing through the oxidant gas flow path is a value exceeding 120% of the maximum value of the premeasured pressure drop of oxidant gas flowing through the oxidant gas flow path.

If it is determined by the determining apparatus described above or another method that the amount of water near the oxidant gas flow path inlet is insufficient and/or that the amount of water near the oxidant gas flow path outlet is excessive, the fuel cell system or the operating method of a fuel cell of the invention increases the amount of water near the oxidant gas flow path inlet and decreases the amount of water near the oxidant gas flow path outlet by increasing the fuel gas flowrate and/or reducing the fuel gas pressure. Also, if it is determined by the determining apparatus described above or another method that the amount of water near the oxidant gas flow path inlet and/or the oxidant gas flow path outlet is insufficient, the fuel cell system or the operating method of a fuel cell of the invention decreases the amount of water that is carried out of the cell by the oxidant gas and increases the amount of water that can be transferred from the oxidant gas flow path outlet side to the fuel gas flow path inlet side by decreasing the oxidant gas flowrate and/or increasing the oxidant gas pressure.

Incidentally, a relationship such as that shown in Expression (3) below is established between the amount of water vapor in the gas flowing through the gas flow path, the non-humidified gas flowrate, the partial pressure of the water vapor, and the total pressure of the gas including the water vapor, common to the fuel gas flow path and the oxidant gas flow path.

$$Q_{H2O} = Q_{dry} \times \frac{P_{H2O}}{P_{total} - P_{H2O}} \qquad (3)$$

(where $Q_{H2O}$ represents the amount of water vapor in the gas, $Q_{dry}$ represents the flowrate of the non-humidified gas, $P_{H2O}$ represents the partial pressure of the water vapor, and $P_{total}$ represents the total pressure of the gas including the water vapor.)

From Expression (3), $Q_{H2O}$ is proportional to $Q_{dry}$, so it is evident that the flowrate $Q_{dry}$ of the non-humidified gas to be supplied needs to be kept at or above a certain flowrate in order to keep the amount $Q_{H2O}$ of water vapor in the gas at or above a certain amount. However, as indicated by the dew point-humidity measurement at the cathode outlet and the power generating performance following a change in the amount of fuel gas supplied, which will be described later, if the flowrate of the fuel gas is increased too much, the polymer electrolyte membrane will dry out near the oxidant gas flow path inlet, which will lead to a decrease in power generation efficiency. That is, in order to actually maintain good power generation efficiency, the flowrate $Q_{dry}$ of the non-humidified gas must be increased to within an appropriate range. Also, from Expression (3), it is evident that the difference between the total pressure $P_{total}$ of the gas including the water vapor and the partial pressure $P_{H2O}$ of the water vapor (i.e., $P_{total}-P_{H2O}$), i.e., the partial pressure of non-humidified gas to be supplied, is inversely proportional to the amount $Q_{H2O}$ of water vapor in the gas. Therefore, the $Q_{H2O}$ can be increased as the partial pressure of the non-humidified gas is suppressed. However, if the partial pressure of the non-humidified gas is suppressed too much, too much water will be carried away from near the oxidant gas flow path inlet, resulting in the polymer electrolyte membrane near the oxidant gas flow path inlet becoming too dry. Therefore, in order to actually maintain good power generation efficiency, the partial pressure (i.e., $P_{total}-P_{H2O}$) of the non-humidified gas must be reduced to within an appropriate range. Therefore, in order to obtain the effect of the invention, there is an upper limit value for the flowrate $Q_{dry}$ of the non-humidified gas and a lower limit value for the partial pressure of the non-humidified gas (i.e., $P_{total}-P_{H2O}$). As a result, $Q_{H2O}$ is actually unable to be maintained at or above a certain amount by only performing the simple operation of "continuing to increase the flowrate $Q_{dry}$" or "continuing to reduce the partial pressure $(P_{total}-P_{H2O})$". However, by adjusting these two values to within certain ranges, good power generation efficiency can be maintained.

The operation regarding the amount of water vapor can also be applied to oxidant gas control. From Expression (3), $Q_{H2O}$ is proportional to $Q_{dry}$ so it is evident that the flowrate $Q_{dry}$ of the non-humidified gas to be supplied needs to be kept at or below a certain flowrate in order to keep the amount $Q_{H2O}$ of water vapor in the gas at or below a certain amount. However, if the flowrate of the oxidant gas is decreased too much, the water that is carried outside the fuel cell by the oxidant gas will be reduced. As a result, so-called flooding will occur near the oxidant gas flow path outlet, which will lead to a decrease in power generation efficiency. That is, in order to actually maintain good power generation efficiency, the flowrate $Q_{dry}$ of the non-humidified gas must be decreased to within an appropriate range. Also, from Expression (3), it is evident that the difference between the total pressure $P_{total}$ of the gas including the water vapor and the partial pressure $P_{H2O}$ of the water vapor (i.e., $P_{total}$-total $P_{H2O}$), i.e., the partial pressure of non-humidified gas to be supplied, is inversely proportional to the amount $Q_{H2O}$ of water vapor in the gas. Therefore, the $Q_{H2O}$ can be suppressed as the partial pressure of the non-humidified gas is increased. However, if the partial pressure of the non-humidified gas is increased too much, not enough water will be carried away from near the oxidant gas flow path inlet, also resulting in flooding occurring near the oxidant gas flow path outlet. Therefore, in order to actually maintain good power generation efficiency, the partial pressure (i.e., $P_{total}-P_{H2O}$) of the non-humidified gas must be increased to within an appropriate range. Therefore, in order to obtain the effect of the invention, there is a lower limit value for the flowrate $Q_{dry}$ of the non-humidified gas and an upper limit value for the partial pressure (i.e., $P_{total}-P_{H2O}$) of the non-humidified gas. As a result, good power generation efficiency is actually unable to be maintained by only performing the simple operation of "continuing to decrease the flowrate $Q_{dry}$" or "continuing to increase the partial pressure $(P_{total}-P_{H2O})$". However, by adjusting these two values to within certain ranges, good power generation efficiency can be maintained.

Figure 2:
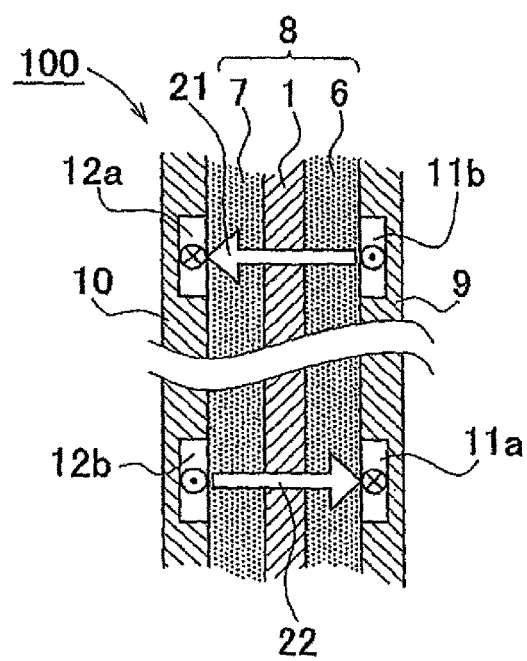
FIG. 2 is a sectional view showing a frame format of water circulation in the single cell of the fuel cell system of the invention.

FIG. 2 is a sectional view showing a frame format of water circulation in the single cell of the fuel cell system of the invention. For simplification, the cathode and anode electrodes are shown without distinguishing between the gas diffusion layer and the catalyst layer. Incidentally, the symbols of the circle with a dot in the center and the circle with an X in the center indicate the direction of flow of the gas flowing through the flow path, just as in FIG. 1. Also, the oxidant gas is introduced from an oxidant gas flow path inlet 11a and flows to an oxidant gas flow path outlet 11b, while the fuel gas is introduced from a fuel gas flow path inlet 12a and flows to a fuel gas flow path outlet 12b. Now, the area near the oxidant gas flow path outlet 11b is wet from the water produced by the reaction shown in Expression (2) above. This water is carried through a polymer electrolyte membrane 1 to near the fuel gas flow path inlet 12a, as shown by the arrow 21. At this time, more of the water carried to near the fuel gas flow path inlet 12a can be carried to near the fuel gas flow path outlet 12b by adjusting the flowrate $Q_{dry}$ of the non-humidified fuel gas and/or the partial pressure $(P_{total}-P_{H2O})$ of the non-humidified fuel gas as described above. This water is carried through the polymer electrolyte membrane 1 to near the oxidant gas flow path inlet 11a, as shown by the arrow 22, thereby making it possible to adjust the amount of water near the oxidant gas flow path inlet 11a which tends to become dry, and the amount of water near the oxidant gas flow path outlet 11 which tends to become wet. As a result, a single cell in which water is not distributed unevenly on the surface while there is no humidity can be realized.

Moreover, when the area near the oxidant gas flow path outlet 11b is dry, it is possible to reduce the amount of water that is carried out of the fuel cell by the oxidant gas, such that water can be accumulated near the oxidant gas flow path outlet 11b, by adjusting the flowrate $Q_{dry}$ of the non-humidified oxidant gas and/or the partial pressure $(P_{total}-P_{H2O})$ of the non-humidified oxidant gas described above.

In order to maintain good power generation efficiency, the stoichiometric ratio of the fuel gas is preferably increased to within the range between 1.0 and 10, inclusive. This is because if the stoichiometric ratio exceeds 10, the polymer electrolyte membrane becomes dry at the fuel gas flow path inlet, which leads to a decrease in power generation efficiency, and if the stoichiometric ratio is less than 1.0, the minimum amount of gas necessary to operate at the specified output is unable to be supplied, and what is more, a sufficient amount of water is not able to be retained in the fuel gas so the amount of water that is able to be carried through the electrolyte membrane to the oxidant gas flow path is limited. In particular, with the fuel cell system of the invention, the fuel gas flowrate is preferably increased by adjusting the fuel gas supply apparatus (this kind of control apparatus will hereinafter be referred to as a "fuel gas flowrate control apparatus"). This is because the fuel gas flowrate can be increased through the simple operation of adjusting the fuel gas supply apparatus. An example of the fuel gas supply apparatus in this case includes a fuel gas canister and a fuel gas pump. Incidentally, the stoichiometric ratio is more preferably increased to within a range between 1.0 and 5.0, and most preferably, increased to within a range between 1.0 and 3.0, inclusive.

In order to maintain good power generation efficiency, the fuel gas pressure is preferably reduced to within a range between atmospheric pressure and 0.3 MPa, inclusive. This is because if the pressure exceeds 0.3 MPa, a sufficient amount of water is not able to be retained in the fuel gas, and as a result, the amount of water that can be carried through the electrolyte membrane to the oxidant gas flow path is limited. Also, if the pressure is less than atmospheric pressure, the fuel necessary to generate power is not able to be sufficiently supplied. In particular, with the fuel cell system of the invention, the fuel gas pressure is preferably reduced by adjusting a fuel gas pressure regulating valve provided near the fuel gas flow path outlet (this kind of control apparatus will hereinafter be referred to as a "fuel gas pressure control apparatus"). This is because the fuel gas pressure can be reduced through the simple operation of adjusting the fuel gas pressure regulating valve. The fuel gas pressure is more preferably reduced to within a range between atmospheric pressure and 0.2 MPa, inclusive, and most preferably, reduced to within a range between atmospheric pressure and 0.1 MPa, inclusive.

Incidentally, the fuel gas pressure can also be regulated by adjusting the fuel gas supply apparatus as described above. However, it is difficult to increase the fuel gas flowrate and reduce the fuel gas pressure simultaneously using only the fuel gas supply apparatus. Therefore, the fuel gas supply apparatus at the fuel gas flow path inlet is adjusted in combination with an adjustment of the fuel gas pressure regulating valve near the fuel gas flow path outlet so that the fuel gas flowrate can be increased and the fuel gas pressure can be reduced.

In order to maintain good power generation efficiency, the stoichiometric ratio of the oxidant gas is preferably reduced to within a range between 1.0 and 3.0, inclusive. This is because if the stoichiometric ratio exceeds 3.0, a sufficient amount of water is not able to be retained in the oxidant gas flow path, and as a result, the amount of water that can be carried through the electrolyte membrane to the fuel gas flow path is limited, and if the stoichiometric ratio is less than 1.0, the minimum amount of gas necessary to operate at the specified output is unable to be supplied, and what is more, flooding in the oxidant gas flow path is unable to be avoided. In particular, with the fuel cell system of the invention, the oxidant gas flowrate is preferably decreased by adjusting an oxidant gas supply apparatus (this kind of control apparatus will hereinafter be referred to as an "oxidant gas flowrate control apparatus"). This is because the oxidant gas flowrate can be decreased through the simple operation of adjusting the oxidant gas supply apparatus. Examples of the oxidant gas supply apparatus in this case include an oxidant gas canister and an oxidant gas pump. Incidentally, the stoichiometric ratio is more preferably reduced to within a range between 1.0 and 2.5, inclusive, and most preferably, reduced to within the range between 1.2 and 2.0, inclusive.

In order to maintain good power generation efficiency, the oxidant gas pressure is preferably increased to within a range between atmospheric pressure and 0.3 MPa, inclusive. This is because if the pressure exceeds 0.3 MPa, flooding in the oxidant gas flow path is unable to be avoided. Also, Also, if the pressure is less than atmospheric pressure, a sufficient amount of water is not able to be retained in the oxidant gas flow path, and as a result, the amount of water that can be carried through the electrolyte membrane to the fuel gas flow path is limited. In particular, with the fuel cell system of the invention, the oxidant gas pressure is preferably increased by adjusting an oxidant gas pressure regulating valve provided near the oxidant gas flow path outlet (this kind of control apparatus will hereinafter be referred to as an "oxidant gas pressure control apparatus"). This is because the oxidant gas pressure can be increased through the simple operation of adjusting the oxidant gas pressure regulating valve. The oxidant gas pressure is more preferably increased to within a range between 0.12 and 0.25 MPa, inclusive, and most preferably, increased to within a range between 0.14 and 0.2 MPa, inclusive.

Incidentally, the oxidant gas pressure can also be regulated by adjusting the oxidant gas supply apparatus as described above. However, it is difficult to decrease the oxidant gas flowrate and increase the oxidant gas pressure simultaneously using only the oxidant gas supply apparatus. Therefore, the oxidant gas supply apparatus at the oxidant gas flow path inlet is adjusted in combination with an adjustment of the oxidant gas pressure regulating valve near the oxidant gas flow path outlet so that the oxidant gas flowrate can be decreased and the oxidant gas pressure can be increased.

Figure 3:
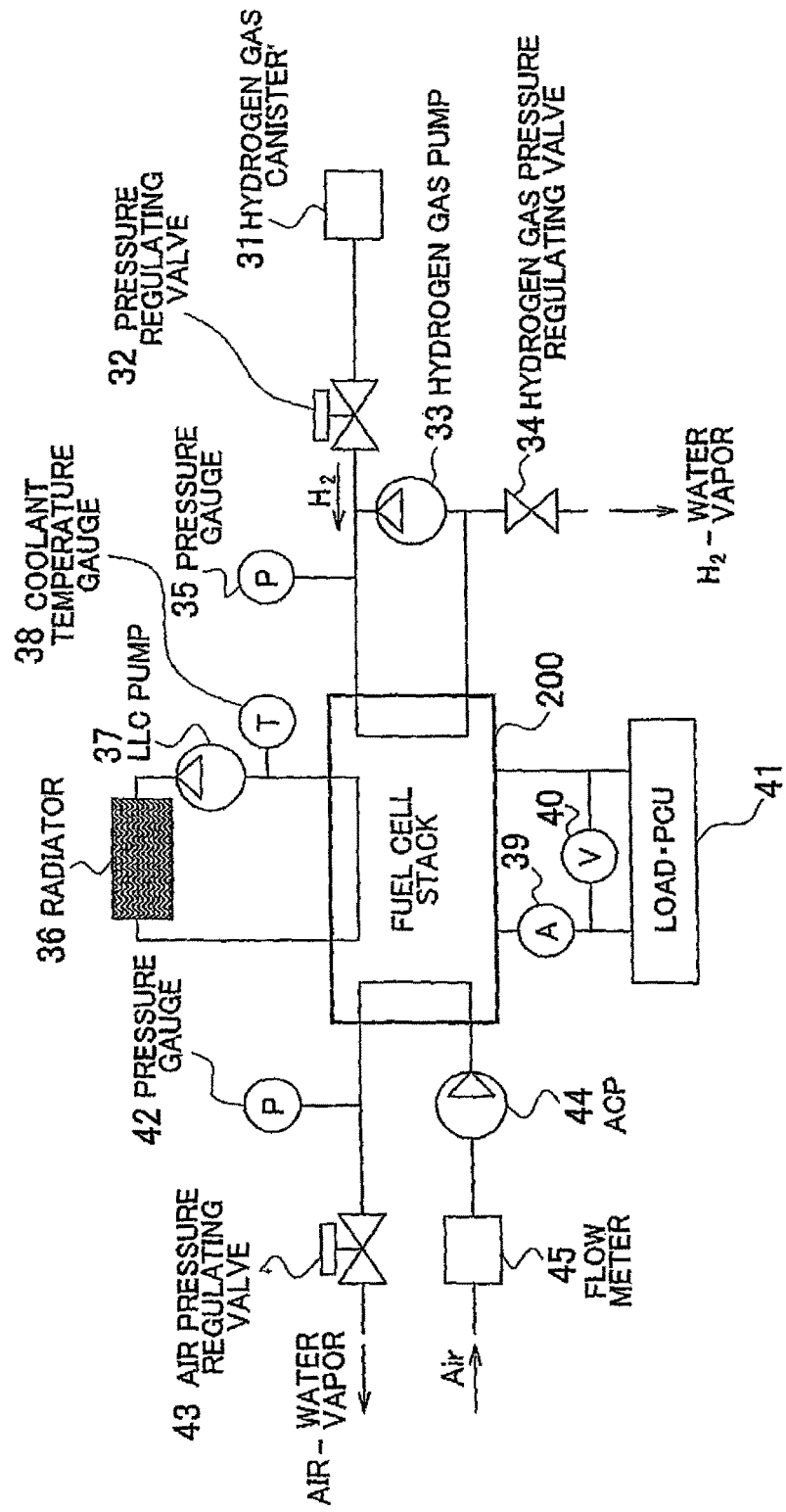
FIG. 3 is a view showing a frame format of a classic example of a preferable fuel cell system, for carrying out the operating method of the fuel cell of the invention.

FIG. 3 is a view showing a frame format of a classic example of a preferable fuel cell system, for carrying out the operating method of the fuel cell of the invention. Incidentally, the fuel cell described here uses hydrogen gas as the fuel gas and air as the oxidant gas. As shown in the drawing, the fuel gas flow path and the oxidant gas flow path are arranged such that the hydrogen gas, i.e., the fuel gas, and air, i.e., the oxidant gas, flow in opposite directions. Also, the fuel gas flowrate is adjusted (i.e., fuel gas flowrate control) by a hydrogen gas canister 31 and a hydrogen gas pump 33, which is one type of fuel gas supply apparatus. Incidentally, the hydrogen gas pump 33 in the drawing is designed to reuse hydrogen gas that has not been consumed in the fuel cell stack 200. Further, the hydrogen gas pressure is regulated (i.e., fuel gas pressure control) by the hydrogen gas pressure regulating valve 34. More specifically, the structure of this type of system enables both the fuel gas flowrate to be increased and the fuel gas pressure to be reduced. Moreover, the oxidant gas flowrate is adjusted by an air compressor (ACP) 44 which is one type of oxidant gas supply apparatus. Also, the air pressure is regulated by an air pressure regulating valve 43. More specifically, the structure of this type of system enables both the oxidant gas flowrate to be decreased and the oxidant gas pressure to be increased.

Also, as shown in FIG. 3, a gas flowrate measuring device (i.e., a regulator 32 with a hydrogen canister 31 on the hydrogen side and a flow meter 45 on the air side) and a gas pressure measuring device (i.e., a hydrogen side pressure meter 35 and an air side pressure gauge 42) are provided in the fuel gas flow path and the oxidant gas flow path.

Moreover, although not shown in FIG. 3, stack pressure drop measuring devices are provided in the oxidant gas flow path and the fuel gas flow path. More specifically, these stack pressure drop measuring devices are pressure sensors that are provided at both the inlet and outlet of both the oxidant gas flow path and the fuel gas flow path. The pressure drop is calculated as follows: ΔP (pressure drop)=P (inlet pressure)−P (outlet pressure).

Also, as shown in FIG. 3, a coolant temperature measuring device 38 is provided in a cooling system that has a radiator 36 in order to ascertain the state of the fuel cell, more specifically, whether the fuel cell is dry or wet, by estimating the coolant temperature beforehand. Incidentally, it is preferable to designate a given temperature within the range between 70 and 120° C., inclusive, as a preset value, and regard a value exceeding this set value as indicative of an abnormality (e.g., uneven water distribution) in the fuel cell.

Moreover, as shown in FIG. 3, the electrical system which includes a voltmeter 40 and an ammeter 39 also includes a power control unit (PCU) 41 for controlling the load as well as controlling the premeasured voltage and resistance of the single cell 100 and/or the stack 200 at each of a plurality of temperatures.

Also, as shown in FIG. 3, the fuel gas flow path is assumed to have a recirculating function created by the hydrogen gas pump 33 and the hydrogen gas pressure regulating valve 34, though it may also be a non-recirculating system such as a dead end system in which a small amount of fuel gas is continuously discharged.

Figure 4:
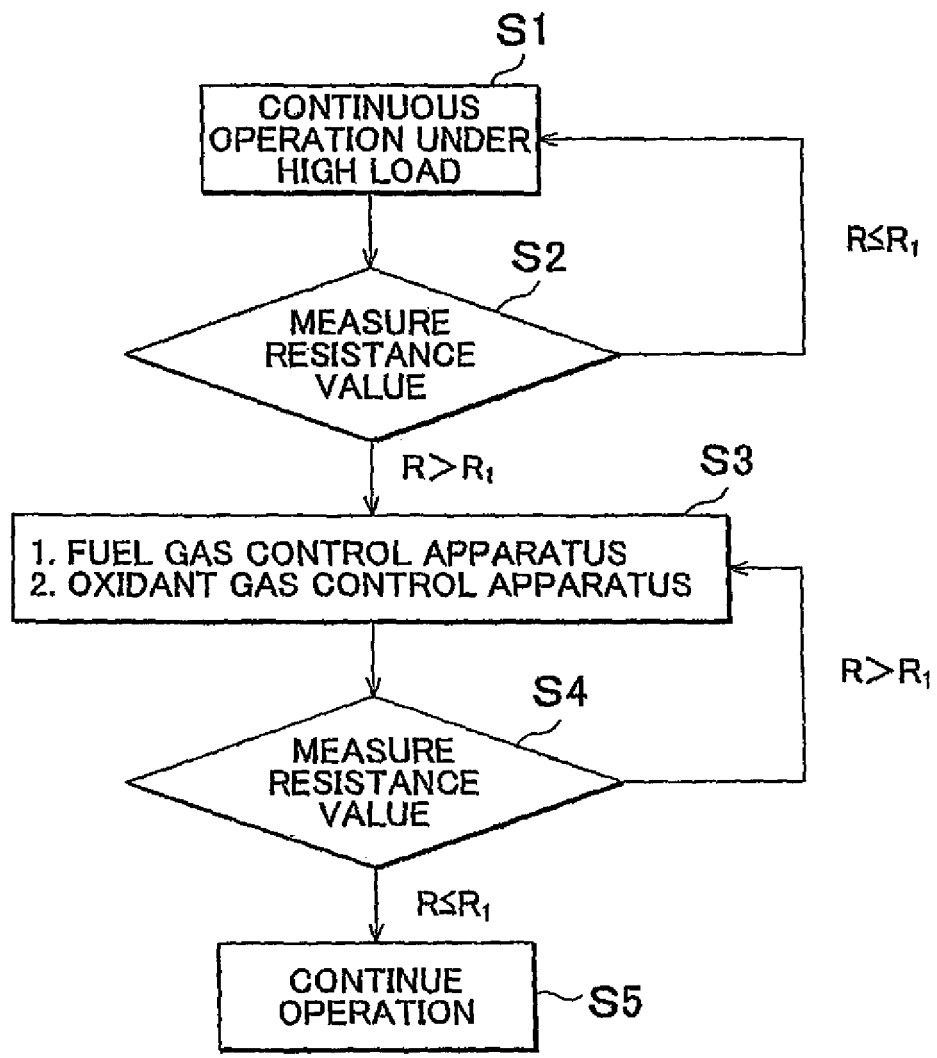
FIG. 4 is a flowchart illustrating a routine of the classic example of the preferable fuel cell system, for carrying out the operating method of the fuel cell of the invention.

FIG. 4 is a flowchart illustrating a routine of the classic example of the preferable fuel cell system, for carrying out the operating method of the fuel cell of the invention. Now, a case in which the fuel cell system is continuously operating under a high load will be assumed (S1). During operation, a resistance value measurement of the overall fuel cell, which is one way to determine the amount of water, is taken every 10 seconds to every 10 minutes (S2). Here, the step that will be performed next differs depending on whether the resistance value R is greater than a value (hereinafter referred to as set value $R_1$) of 105% of the minimum value of the premeasured resistance of the single cell and/or the stack at each of a plurality of temperatures (i.e., determining apparatus A). If the resistance value R is equal to or less than $R_1$, continuous operation under a high load is continued (S1). If, on the other hand, the resistance value R is greater than the set value $R_1$, it is determined that the amount of water near the oxidant gas flow path inlet and/or the oxidant gas flow path outlet is insufficient, and the fuel gas control apparatus and/or the oxidant gas control apparatus is operated (S3). Incidentally, normally the fuel gas control apparatus is operated when the amount of water near the oxidant gas flow path inlet is insufficient, and the oxidant gas control apparatus is operated when the amount of water near the oxidant gas flow path outlet is insufficient, though both of these control apparatuses may also be operated simultaneously (S3). The fuel gas control apparatus and the oxidant gas control apparatus may also adjust the stoichiometric ratio and/or regulate the pressure, but most preferably they adjust the stoichiometric ratio and regulate the pressure simultaneously. After the fuel gas control apparatus and/or the oxidant gas control apparatus is operated (S3), the resistance value measurement of the overall fuel cell is taken (S4). If the resistance value R is greater than the set value $R_1$, the fuel gas control apparatus and/or the oxidant gas control apparatus is operated again (S3). If, on the other hand, the resistance value R is equal to or less than the set value $R_1$, then continuous operation under a high load is continued (S5).

Figure 5:
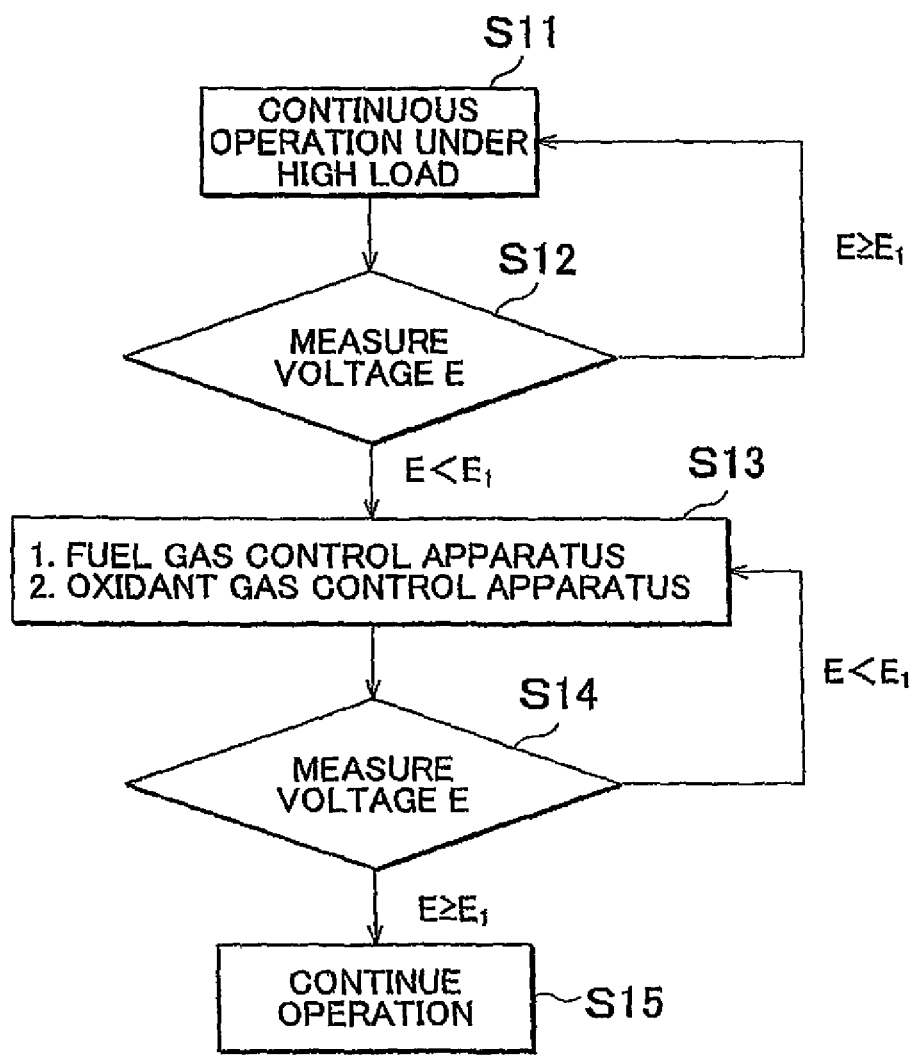
FIG. 5 is a flowchart illustrating a routine of a second classic example of the preferable fuel cell system, for carrying out the operating method of the fuel cell of the invention.

FIG. 5 is a flowchart illustrating a routine of a second classic example of the preferable fuel cell system, for carrying out the operating method of the fuel cell of the invention. Now, a case in which the fuel cell system is continuously operating under a high load will be assumed (S11). During operation, a voltage measurement of the overall fuel cell, which is one way to determine the amount of water, is taken every 10 seconds to 10 minutes (S12). Here, the step that will be performed next differs depending on whether the voltage E is less than a value (hereinafter referred to as set value $E_1$) of 95% of the maximum value of the premeasured voltage of the single cell and/or the stack at each of a plurality of temperatures (i.e., determining apparatus B). If the voltage E is equal to or greater than $E_1$, continuous operation under a high load is continued (S11). If, on the other hand, the voltage E is less than the set value $E_1$, it is determined that the amount of water near the oxidant gas flow path inlet and/or the oxidant gas flow path outlet is excessive, and the fuel gas control apparatus and/or the oxidant gas control apparatus is operated (S13). Incidentally, normally the oxidant gas control apparatus is operated when the amount of water near the oxidant gas flow path inlet is excessive, and the fuel gas control apparatus is operated when the amount of water near the oxidant gas flow path outlet is excessive, though both of these control apparatuses may also be operated simultaneously (S13). The fuel gas control apparatus and the oxidant gas control apparatus may also adjust the stoichiometric ratio and/or regulate the pressure, but most preferably they adjust the stoichiometric ratio and regulate the pressure simultaneously. After the fuel gas control apparatus and/or the oxidant gas control apparatus is operated (S13), the voltage measurement of the overall fuel cell is taken (S14). If the voltage E is less than the set value $E_1$, the fuel gas control apparatus and/or the oxidant gas control apparatus is operated again (S13). If, on the other hand, the voltage E is equal to or greater than the set value $E_1$, then continuous operation under a high load is continued (S15).

Figure 6:
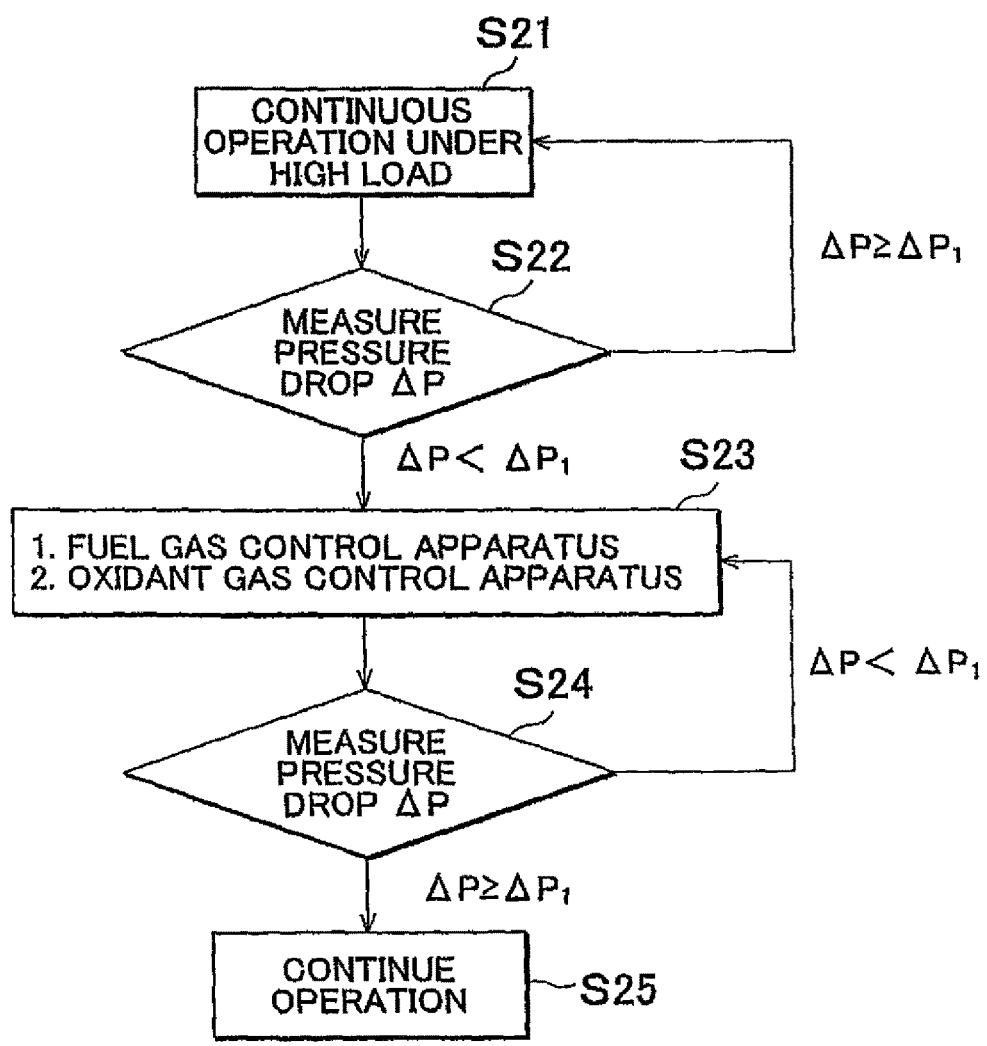
FIG. 6 is a flowchart illustrating a routine of a third classic example of the preferable fuel cell system, for carrying out the operating method of the fuel cell of the invention.

FIG. 6 is a flowchart illustrating a routine of a third classic example of the preferable fuel cell system, for carrying out the operating method of the fuel cell of the invention. Now, a case in which the fuel cell system is continuously operating under a high load will be assumed (S21). During operation, a pressure drop measurement of the oxidant gas flowing through the oxidant gas flow path, which is one way to determine the amount of water, is taken every 10 seconds to 10 minutes (S22). Here, the step that will be performed next differs depending on whether the pressure drop $\Delta P$ is less than a value (hereinafter referred to as set value $\Delta P_1$) of 105% of the minimum value of the premeasured pressure drop of the oxidant gas flowing through the oxidant gas flow path (i.e., determining apparatus C). If the pressure drop $\Delta P$ is equal to or greater than $\Delta P_1$, continuous operation under a high load is continued (S21). If, on the other hand, the pressure drop $\Delta P$ is less than the set value $\Delta P_1$, it is determined that the amount of water near the oxidant gas flow path inlet and/or the oxidant gas flow path outlet is insufficient, and the fuel gas control apparatus and/or the oxidant gas control apparatus is operated (S23). Incidentally, normally the fuel gas control apparatus is operated when the amount of water near the oxidant gas flow path inlet is insufficient, and the oxidant gas control apparatus is operated when the amount of water near the oxidant gas flow path outlet is insufficient, though both of these control apparatuses may also be operated simultaneously (S23). The fuel gas control apparatus and the oxidant gas control apparatus may also adjust the stoichiometric ratio and/or regulate the pressure, but most preferably they adjust the stoichiometric ratio and regulate the pressure simultaneously. After the fuel gas control apparatus and/or the oxidant gas control apparatus is operated (S23), the pressure drop measurement of the oxidant gas flowing through the oxidant gas flow path is taken (S24). If the pressure drop $\Delta P$ is less than the set value $\Delta P_1$, the fuel gas control apparatus and/or the oxidant gas control apparatus is operated again (S23). If, on the other hand, the pressure drop $\Delta P$ is equal to or greater than the set value $\Delta P_1$, then continuous operation under a high load is continued (S25).

Figure 7:
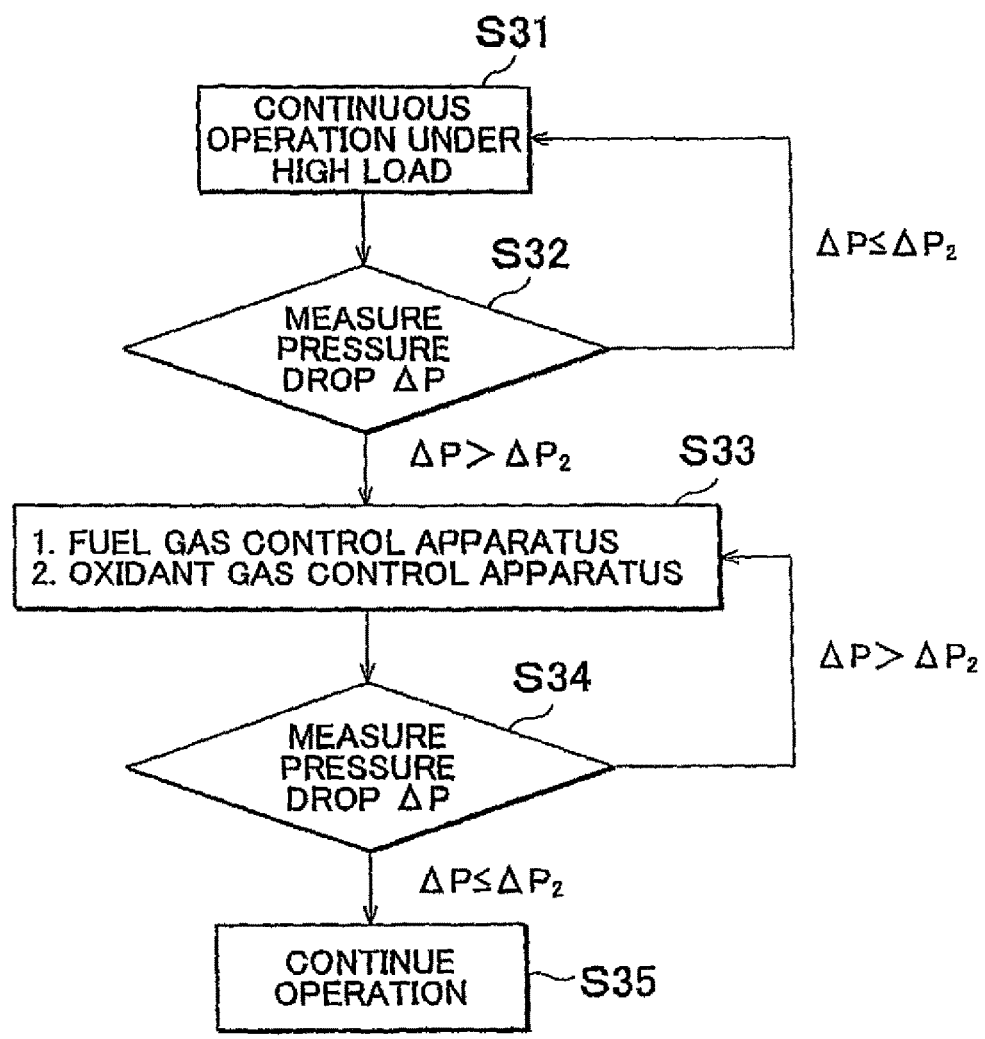
FIG. 7 is a flowchart illustrating a routine of a fourth classic example of the preferable fuel cell system, for carrying out the operating method of the fuel cell of the invention.

FIG. 7 is a flowchart illustrating a routine of a fourth classic example of the preferable fuel cell system, for carrying out the operating method of the fuel cell of the invention. Now, a case in which the fuel cell system is continuously operating under a high load will be assumed (S31). During operation, a pressure drop measurement of oxidant gas flowing through the oxidant gas flow path, which is one way to determine the amount of water, is taken every 10 seconds to 10 minutes (S32). Here, the step that will be performed next differs depending on whether the pressure drop ΔP is greater than a value (hereinafter referred to as set value $\Delta P_2$; incidentally, $\Delta P_2$ is independent of $\Delta P_1$ described above) of 105% of the maximum value of the premeasured pressure drop of the oxidant gas flowing through the oxidant gas flow path (i.e., determining apparatus D). If the pressure drop ΔP is equal to or less than $\Delta P_2$, continuous operation under a high load is continued (S31). If, on the other hand, the pressure drop ΔP is greater than the set value $\Delta P_2$, it is determined that the amount of water near the oxidant gas flow path inlet and/or the oxidant gas flow path outlet is excessive, and the fuel gas control apparatus and/or the oxidant gas control apparatus is operated (S33). Incidentally, normally the oxidant gas control apparatus is operated when the amount of water near the oxidant gas flow path inlet is excessive, and the fuel gas control apparatus is operated when the amount of water near the oxidant gas flow path outlet is excessive, though both of these control apparatuses may also be operated simultaneously (S33). The fuel gas control apparatus and the oxidant gas control apparatus may also adjust the stoichiometric ratio and/or regulate the pressure, but most preferably they adjust the stoichiometric ratio and regulate the pressure simultaneously. After the fuel gas control apparatus and/or the oxidant gas control apparatus is operated (S33), the pressure drop measurement of the oxidant gas flowing through the oxidant gas flow path is taken (S34). If the pressure drop ΔP is greater than the set value $\Delta P_2$, the fuel gas control apparatus and/or the oxidant gas control apparatus is operated again (S33). If, on the other hand, the pressure drop ΔP is equal to or less than the set value $\Delta P_2$, then continuous operation under a high load is continued (S35).

One mode of the fuel cell system of the invention includes i) the fuel gas control apparatus, ii) the oxidant gas control apparatus, iii) the determining apparatus A and/or the determining apparatus C, iv) the determining apparatus B and/or the determining apparatus D, v) a water transfer promoting control starting apparatus A, vi) a water transfer promoting control stopping apparatus A, vii) a water transfer suppressing control starting apparatus A, viii) a water transfer suppressing control stopping apparatus A, and ix) an insufficient water amount final determining apparatus A. The water transfer promoting control starting apparatus A operates the fuel gas control apparatus one or more times after it is determined by the determining apparatus A and/or C that the amount of water near the oxidant gas flow path inlet is insufficient. The water transfer promoting control stopping apparatus A stops the fuel gas control apparatus after it is determined by the determining apparatus A and/or C that the amount of water near the oxidant gas flow path outlet is insufficient after the water transfer promoting control starting apparatus A operates the fuel gas control apparatus. The water transfer suppressing control starting apparatus A operates the oxidant gas control apparatus one or more times after the water transfer promoting control stopping apparatus A stops the fuel gas control apparatus. The water transfer suppressing control stopping apparatus A stops all of the elements of the oxidant gas control apparatus after it is determined by the determining apparatus B and/or D that the amount of water near the oxidant gas flow path outlet is excessive. After the water transfer suppressing control stopping apparatus A stops all of the elements of the oxidant gas control apparatus, the insufficient water amount final determining apparatus A has the water transfer promoting control starting apparatus A operate the fuel gas control apparatus again if it is determined by the determining apparatus A and/or C that the amount of water near the oxidant gas flow path inlet is insufficient, and continues to operate the fuel cell if it is determined by the determining apparatus A and/or C that the amount of water near the oxidant gas flow path inlet is not insufficient.

Figure 8:
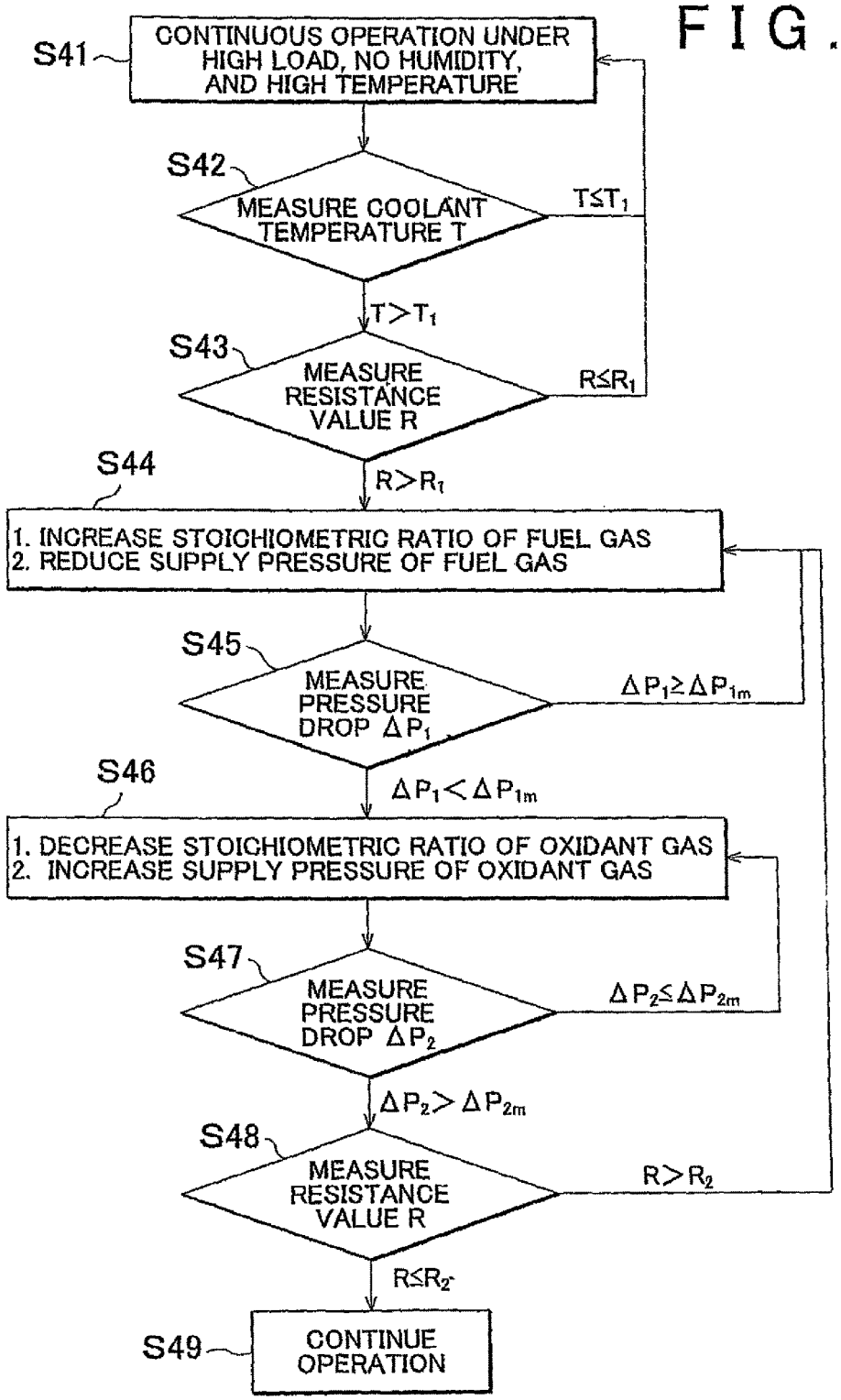
FIG. 8 is a flowchart illustrating a routine of a fifth classic example of the preferable fuel cell system, for carrying out the operating method of the fuel cell of the invention.

FIG. 8 is a flowchart illustrating a routine of a fifth classic example of the preferable fuel cell system, for carrying out the operating method of the fuel cell of the invention. Now, a case in which the fuel cell system is continuously operating under a high load will be assumed (S41). During operation, the coolant temperature T is measured by the coolant temperature measuring device described above every 10 seconds to 10 minutes (S42). If at this time the measured coolant temperature T is equal to or less than a set value $T_1$, then operation continues (S41). If, on the other hand, the coolant temperature T is greater than the set value $T_1$, then the determining apparatus A is operated (i.e., the resistance is measured) (S43). At this time, if the measured resistance value R is equal to or less than the set value $R_1$, it is determined that an appropriate amount of water is retained near the oxidant gas flow path inlet so operation under a high load continues (S41). Incidentally, the operating procedures up to this point are essentially the same as the first part of the classic example shown in FIG. 4. The difference between this example and the classic example shown in FIG. 4 is that the amount of water near the oxidant gas flow path inlet is increased as described below if the resistance R is greater than the set value $R_1$.

If the resistance value R is greater than the set value $R_1$, the determining apparatus A (S43) determines that the amount of water near the oxidant gas flow path inlet is insufficient, and the fuel gas flowrate control apparatus and/or the fuel gas pressure control apparatus is operated (by the water transfer promoting control starting apparatus A (S44)). This starting apparatus A (S44) operates the fuel gas flowrate control apparatus and/or the fuel gas pressure control apparatus one or more times until it is determined by the determining apparatus C (i.e., the pressure drop measurement) (S45) that the amount of water near the oxidant gas flow path outlet is insufficient, at which time that operation is stopped (by the water transfer promoting control stopping apparatus A) based on that determination. Next, the oxidant gas flowrate control apparatus and/or the oxidant gas pressure control apparatus is operated (by the water transfer suppressing control starting apparatus A (S46)). This starting apparatus A (S46) operates the oxidant gas flowrate control apparatus and/or the oxidant gas pressure control apparatus one or more times until it is determined by the determining apparatus D (i.e., the pressure drop measurement) (S47) that the amount of water near the oxidant gas flow path outlet is excessive, at which time that operation is stopped (by the water transfer suppressing control stopping apparatus A) based on that determination. Finally, it is determined by the determining apparatus A (i.e., the resistance measurement) whether the amount of water near the oxidant gas flow path inlet is insufficient. If the amount of water is insufficient, the water transfer promoting control starting apparatus A (S44) operates the fuel gas flowrate control apparatus and/or the fuel gas pressure control apparatus again. If, on the other hand, the amount of water is not insufficient, operation of the fuel cell is continued (S49).

With a fuel cell system having this kind of structure, an appropriate amount of water, which is neither too much nor too little, can be maintained near the oxidant gas flow path inlet and outlet by increasing the amount of water near the oxidant gas flow path outlet using the water transfer suppressing control starting apparatus A after promoting the transfer of water from near the oxidant gas flow path outlet to near the oxidant gas flow path inlet using the water transfer promoting control starting apparatus A when it is determined that the amount of water near the oxidant gas flow path inlet is insufficient. Also, with the fuel cell system of the invention, it is possible to prevent the water in the entire oxidant gas flow path from being unevenly distributed by repeating the series of steps again based on the results from the insufficient water amount final determining apparatus A.

From the same viewpoint, a mode of the operating method of a fuel cell of the invention may be structured as follows. That is, if it is determined that the amount of water near the oxidant gas flow path inlet is insufficient, the stoichiometric ratio of the fuel gas is increased to within a range between 1.0 and 10, inclusive, and/or the fuel gas pressure is reduced to within a range between atmospheric pressure and 0.3 MPa, inclusive, one or more times. Then, after it is determined that the amount of water near the oxidant gas flow path outlet is insufficient, the fuel gas control is stopped. Next, the stoichiometric ratio of the oxidant gas is decreased to within a range between 1.0 and 3.0, inclusive, and/or the oxidant gas pressure is increased to within a range between atmospheric pressure and 0.3 MPa, inclusive, one or more times. Then, after it is determined that the amount of water near the oxidant gas flow path outlet is excessive, the oxidant gas control is stopped. If after this it is determined that the amount of water near the oxidant gas flow path inlet is insufficient, the fuel gas control is started again. If, on the other hand, it is determined that the amount of water near the oxidant gas flow path inlet is not insufficient, operation of the fuel cell is continued.

Another mode of the fuel cell system of the invention includes i) the fuel gas control apparatus, ii) the oxidant gas control apparatus, iii) the determining apparatus A and/or the determining apparatus C, iv) the determining apparatus B and/or the determining apparatus D, v) a water transfer suppressing control starting apparatus B, vi) a water transfer suppressing control stopping apparatus B, a water transfer promoting control starting apparatus B, viii) a water transfer promoting control stopping apparatus B, and ix) an insufficient water amount final determining apparatus B. The water transfer suppressing control starting apparatus B operates the oxidant gas control apparatus one or more times after it is determined by the determining apparatus A and/or C that the amount of water near the oxidant gas flow path inlet is insufficient. The water transfer suppressing control stopping apparatus B stops the oxidant gas control apparatus after it is determined by the determining apparatus B and/or D that the amount of water near the oxidant gas flow path outlet is excessive after the water transfer suppressing control starting apparatus B operates the oxidant gas control apparatus. The water transfer promoting control starting apparatus B operates the fuel gas control apparatus one or more times after the water transfer suppressing control stopping apparatus B stops the oxidant gas control apparatus. The water transfer promoting control stopping apparatus B stops all of the elements of the fuel gas control apparatus after it is determined by the determining apparatus A and/or C that the amount of water near the oxidant gas flow path outlet is insufficient. After the water transfer promoting control stopping apparatus B stops all of the elements of the fuel gas control apparatus, the insufficient water amount final determining apparatus B has the water transfer suppressing control starting apparatus B operate the oxidant gas control apparatus again if it is determined by the determining apparatus A and/or C that the amount of water near the oxidant gas flow path inlet is insufficient, and continues to operate the fuel cell if it is determined by the determining apparatus A and/or C that the amount of water near the oxidant gas flow path inlet is not insufficient.

Figure 9:
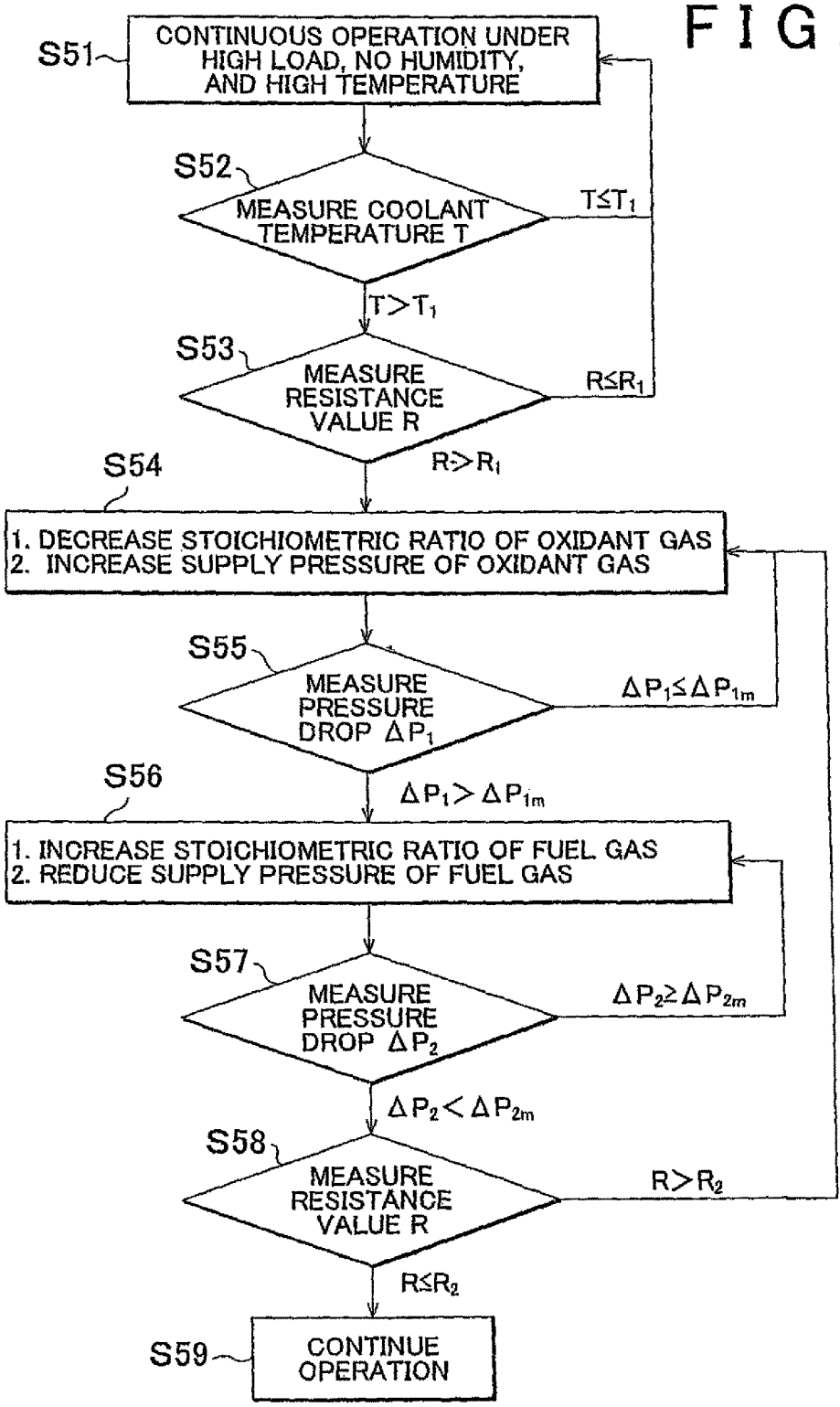
FIG. 9 is a flowchart illustrating a routine of a sixth classic example of the preferable fuel cell system, for carrying out the operating method of the fuel cell of the invention.

FIG. 9 is a flowchart illustrating a routine of a sixth classic example of the preferable fuel cell system, for carrying out the operating method of the fuel cell of the invention. Now, a case in which the fuel cell system is operating continuously under a high load will be assumed (S51). From this state until the coolant temperature T is measured and the determining apparatus A is operated is the same as the fifth classic example (FIG. 8) described above.

If the resistance value R is greater than the set value $R_1$, the determining apparatus A (S53) determines that the amount of water near the oxidant gas flow path inlet is insufficient, and the oxidant gas flowrate control apparatus and/or the oxidant gas pressure control apparatus is operated (by the water transfer suppressing control starting apparatus B) (S54). This starting apparatus B operates the oxidant gas flowrate control apparatus and/or the oxidant gas pressure control apparatus one or more times until it is determined by the determining apparatus D (i.e., the pressure drop measurement) (S55) that the amount of water near the oxidant gas flow path outlet is excessive, at which time that operation is stopped (by the water transfer suppression control stopping apparatus B) based on that determination. Next, the fuel gas flowrate control apparatus and/or the fuel gas pressure control apparatus is operated (by the water transfer promoting control starting apparatus B) (S56). This starting apparatus B (S56) operates the fuel gas flowrate control apparatus and/or the fuel gas pressure control apparatus one or more times until it is determined by the determining apparatus C (i.e., the pressure drop measurement) (S57) that the amount of water near the oxidant gas flow path outlet is insufficient, at which time that operation is stopped (by the water transfer promoting control stopping apparatus B) based on that determination. Finally, it is determined by the determining apparatus A (i.e., the resistance measurement) whether the amount of water near the oxidant gas flow path inlet is insufficient. If the amount of water is insufficient, the water transfer suppressing control starting apparatus B (S54) operates the oxidant gas flowrate control apparatus and/or the oxidant gas pressure control apparatus again. If, on the other hand, the amount of water is not insufficient, operation of the fuel cell is continued (S59).

With a fuel cell system having this kind of structure, an appropriate amount of water, which is neither too much nor too little, can be maintained near the oxidant gas flow path inlet and outlet by suppressing the transfer of water from near the oxidant gas flow path outlet to near the oxidant gas flow path inlet using the water transfer suppressing control starting apparatus B when it is determined that the amount of water near the oxidant gas flow path inlet is insufficient, and after a sufficient amount of water has accumulated near the oxidant gas flow path outlet, promoting the transfer of water from near the oxidant gas flow path outlet to near the oxidant gas flow path inlet using the water transfer promoting control starting apparatus B. Also, with the fuel cell system of the invention, it is possible to prevent the water in the entire oxidant gas flow path from being unevenly distributed by repeating the series of steps again based on the results from the insufficient water amount final determining apparatus B.

From the same viewpoint, a mode of the operating method of a fuel cell of the invention may be structured as follows. That is, if it is determined that the amount of water near the oxidant gas flow path inlet is insufficient, the stoichiometric ratio of the oxidant gas is decreased to within a range between 1.0 and 3.0, inclusive, and/or the oxidant gas pressure is increased to within a range between atmospheric pressure and 0.3 MPa, inclusive, one or more times. Then, after it is determined that the amount of water near the oxidant gas flow path outlet is excessive, the oxidant gas control is stopped. Next, the stoichiometric ratio of the fuel gas is increased to within a range between 1.0 and 10, inclusive, and/or the fuel gas pressure is reduced to within a range between atmospheric pressure and 0.3 MPa, inclusive, one or more times. Then, after it is determined that the amount of water near the oxidant gas flow path outlet is insufficient, the fuel gas control is stopped. If after this it is determined that the amount of water near the oxidant gas flow path inlet is insufficient, the oxidant gas control is started again. If, on the other hand, it is determined that the amount of water near the oxidant gas flow path inlet is not insufficient, operation of the fuel cell is continued.

Yet another mode of the fuel cell system of the invention includes i) the fuel gas control apparatus, ii) the oxidant gas control apparatus, iii) the determining apparatus A and/or the determining apparatus C, iv) the determining apparatus B and/or the determining apparatus D, v) a slightly excessive water transfer promoting control starting apparatus, vi) a slightly excessive water transfer promoting control stopping apparatus, vii) a water transfer suppressing control starting apparatus C, viii) a water transfer suppressing control stopping apparatus C, ix) a water transfer promoting control starting apparatus C, and x) a water transfer promoting control stopping apparatus C. The slightly excessive water transfer promoting control starting apparatus operates the fuel gas control apparatus one or more times. The slightly excessive water transfer promoting control stopping apparatus stops the fuel gas control apparatus after it is determined by the determining apparatus A and/or C that the amount of water near the oxidant gas flow path outlet is insufficient after the slightly excessive water transfer promoting control starting apparatus operates the fuel gas control apparatus. The water transfer suppressing control starting apparatus C operates the oxidant gas control apparatus after the slightly excessive water transfer promoting control stopping apparatus stops the fuel gas control apparatus. The water transfer suppressing control stopping apparatus C stops all of the elements of the oxidant gas control apparatus after it is determined by the determining apparatus B and/or D that the amount of water near the oxidant gas flow path outlet is excessive. The water transfer promoting control starting apparatus C operates the fuel gas control apparatus after the water transfer suppressing control stopping apparatus C stops all of the elements of the oxidant gas control apparatus. After the water transfer promoting control starting apparatus C operates the fuel gas control apparatus, the water transfer promoting control stopping apparatus C has the water transfer suppressing control starting apparatus C operate the oxidant gas control apparatus again if it is determined by the determining apparatus A and/or C that the amount of water near the oxidant gas flow path outlet is insufficient, and stops the fuel gas control apparatus and continues to operate the fuel cell if it is determined by the determining apparatus A and/or C that the amount of water near the oxidant gas flow path outlet is not insufficient.

Figure 10:
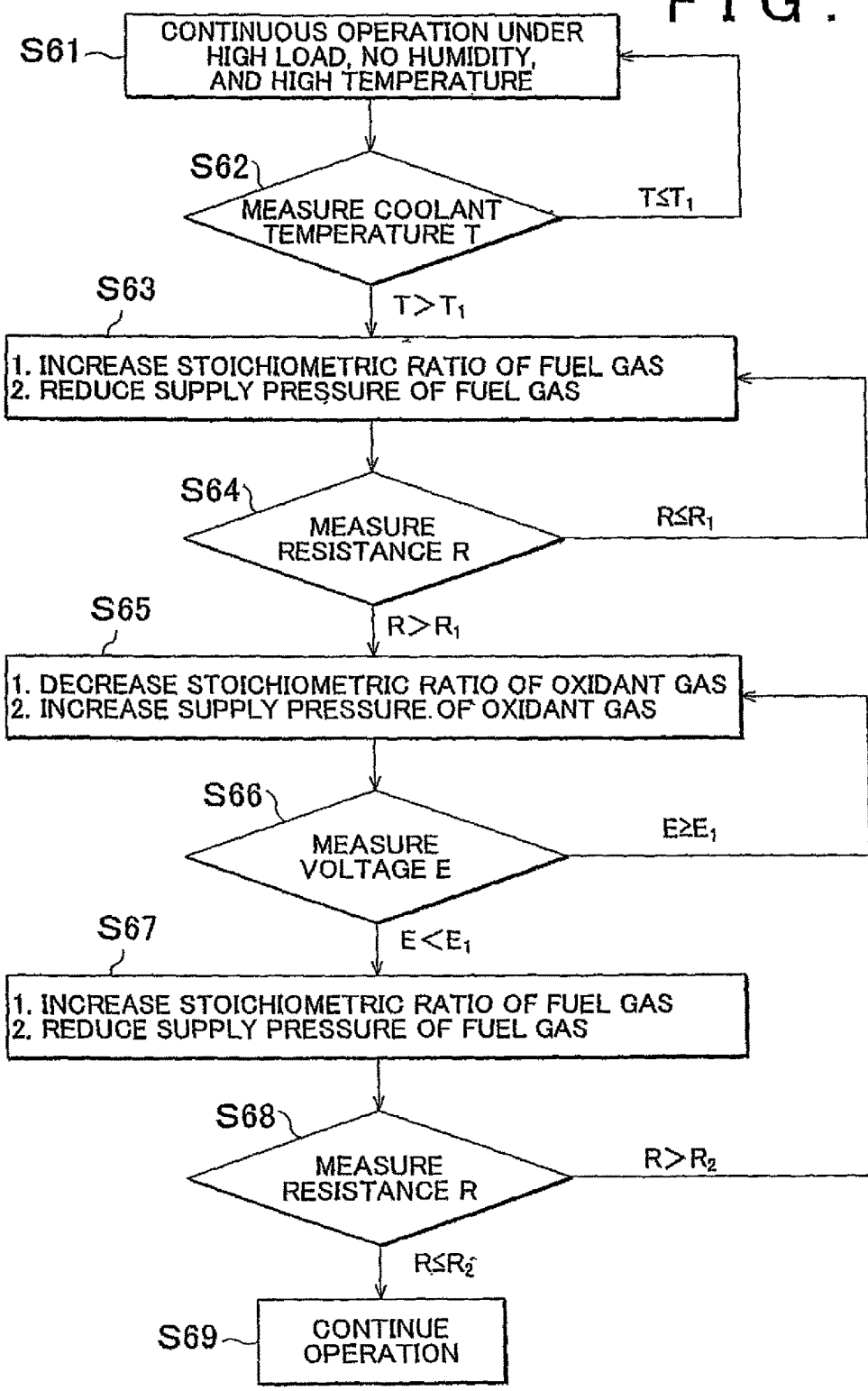
FIG. 10 is a flowchart illustrating a routine of a seventh classic example of the preferable fuel cell system, for carrying out the operating method of the fuel cell of the invention.

FIG. 10 is a flowchart illustrating a routine of a seventh classic example of the preferable fuel cell system, for carrying out the operating method of the fuel cell of the invention. Now, a case in which the fuel cell system is continuously operating under a high load will be assumed (S61). During operation, the coolant temperature T is measured by the coolant temperature measuring device described above every 10 seconds to 10 minutes (S62). If at this time the measured coolant temperature T is equal to or less than a set value $T_1$, then operation continues (S61). If, on the other hand, the coolant temperature T is greater than the set value $T_1$, then the fuel gas flowrate control apparatus and/or the fuel gas pressure control apparatus is operated (by the slightly excessive water transfer promoting control starting apparatus) (S63). This starting apparatus (S63) operates the fuel gas flowrate control apparatus and/or the fuel gas pressure control apparatus one or more times until it is determined by the determining apparatus A (i.e., the resistance measurement) (S64) that the amount of water near the oxidant gas flow path outlet is insufficient, at which time that operation is stopped (by the slightly excessive water transfer promoting control stopping apparatus) based on that determination. That is, the operational steps up to this point temporarily make the amount of water near the oxidant gas flow path outlet insufficient by promoting the transfer of only a slightly excessive amount of water from near the oxidant gas flow path outlet to near the oxidant gas flow path inlet through the fuel gas flow path, after some sort of abnormality in the fuel cell has been detected by the coolant temperature measuring device (62) earlier, without determining the position of that abnormality in the oxidant gas flow path.

After the slightly excessive water transfer promoting control stopping apparatus stops the fuel gas flowrate control apparatus and/or the fuel gas pressure control apparatus, the oxidant gas flowrate control apparatus and/or the oxidant gas pressure control apparatus is operated (by the water transfer suppressing control starting apparatus C) (S65). This starting apparatus C operates the oxidant gas flowrate control apparatus and/or the oxidant gas pressure control apparatus one or more times until it is determined by the determining apparatus B (i.e., the voltage measurement) (S66) that the amount of water near the oxidant gas flow path outlet is excessive, at which time that operation is stopped (by the water transfer suppression control stopping apparatus C) based on that determination. Next, the fuel gas flowrate control apparatus and/or the fuel gas pressure control apparatus is operated (by the water transfer promoting control starting apparatus C) (67). Finally, it is determined by the determining apparatus A (i.e., the resistance measurement) (S68) whether the amount of water near the oxidant gas flow path outlet is insufficient. If the amount of water is insufficient, the water transfer suppressing control starting apparatus C (S65) operates the oxidant gas flowrate control apparatus and/or the oxidant gas pressure control apparatus again. If, on the other hand, the amount of water is not insufficient, operation of the fuel cell is continued (S69).

With a fuel cell system having this kind of structure, an appropriate amount of water, which is neither too much nor too little, can be maintained near the oxidant gas flow path inlet and outlet by first making the amount of water near the oxidant gas flow path outlet appropriately insufficient using the slightly excessive water transfer promoting control starting apparatus, then suppressing the transfer of water from near the oxidant gas flow path outlet to near the oxidant gas flow path inlet using the water transfer suppressing control starting apparatus C, and after a sufficient amount of water has accumulated near the oxidant gas flow path outlet, promoting the transfer of water from near the oxidant gas flow path outlet to near the oxidant gas flow path inlet using the water transfer promoting control starting apparatus C. Also, the fuel cell system of the invention is particularly effective when it includes a fuel cell that has a catalyst layer that is unable to maintain its original performance once it has gotten wet (such as a catalyst layer in which tiny pores in the catalyst layer are blocked by intentionally oxidizing the catalyst), because it does not give the catalyst layer a wet history.

From the same viewpoint, another mode of the operating method of a fuel cell of the invention may be structured as follows. That is, the stoichiometric ratio of the fuel gas is increased to within a range between 1.0 and 10, inclusive, and/or the fuel gas pressure is reduced to within a range between atmospheric pressure and 0.3 MPa, inclusive, one or more times. Then, after it is determined that the amount of water near the oxidant gas flow path outlet is insufficient, the fuel gas control is stopped. Then, the stoichiometric ratio of the oxidant gas is decreased to within a range between 1.0 and 3.0, inclusive, and/or the oxidant gas pressure is increased to within a range between atmospheric pressure and 0.3 MPa, inclusive, one or more times. Then, after it is determined that the amount of water near the oxidant gas flow path outlet is excessive, the oxidant gas control is stopped. Then the stoichiometric ratio of the fuel gas is increased to within a range between 1.0 and 10, inclusive, and/or the fuel gas pressure is reduced to within a range between atmospheric pressure and 0.3 MPa, inclusive. If after this it is determined that the amount of water near the oxidant gas flow path outlet is insufficient, the oxidant gas control is started again. If, on the other hand, it is determined that the amount of water near the oxidant gas flow path outlet is not insufficient, the fuel gas control is stopped and operation of the fuel cell is continued.

Still another mode of the fuel cell system of the invention includes i) the fuel gas control apparatus, ii) the oxidant gas control apparatus, iii) the determining apparatus A and/or the determining apparatus C, iv) the determining apparatus B and/or the determining apparatus D, v) a slightly excessive water transfer suppressing control starting apparatus, vi) a slightly excessive water transfer suppressing control stopping apparatus, vii) a water transfer promoting control starting apparatus D, viii) a water transfer promoting control stopping apparatus D, ix) a water transfer suppressing control starting apparatus D, and x) a water transfer suppressing control stopping apparatus D. The slightly excessive water transfer suppressing control starting apparatus operates the oxidant gas control apparatus one or more times. The slightly excessive water transfer suppressing control stopping apparatus stops the oxidant gas control apparatus after it is determined by the determining apparatus B and/or D that the amount of water near the oxidant gas flow path outlet is excessive after the slightly excessive water transfer suppressing control starting apparatus operates the oxidant gas control apparatus. The water transfer promoting control starting apparatus D operates the fuel gas control apparatus after the slightly excessive water transfer suppressing control stopping apparatus stops the oxidant gas control apparatus. The water transfer promoting control stopping apparatus D stops all of the elements of the fuel gas control apparatus after it is determined by the determining apparatus A and/or C that the amount of water near the oxidant gas flow path outlet is insufficient. The water transfer suppressing control starting apparatus D operates the oxidant gas control apparatus after the water transfer promoting control stopping apparatus D stops all of the elements of the fuel gas control apparatus. After the water transfer suppressing control starting apparatus D operates the oxidant gas control apparatus, the water transfer suppressing control stopping apparatus D has the water transfer promoting control starting apparatus D operate the fuel gas control apparatus again if it is determined by the determining apparatus B and/or D that the amount of water near the oxidant gas flow path outlet is excessive, and stops the oxidant gas control apparatus and continues to operate the fuel cell if it is determined by the determining apparatus B and/or D that the amount of water near the oxidant gas flow path outlet is not excessive.

Figure 11:
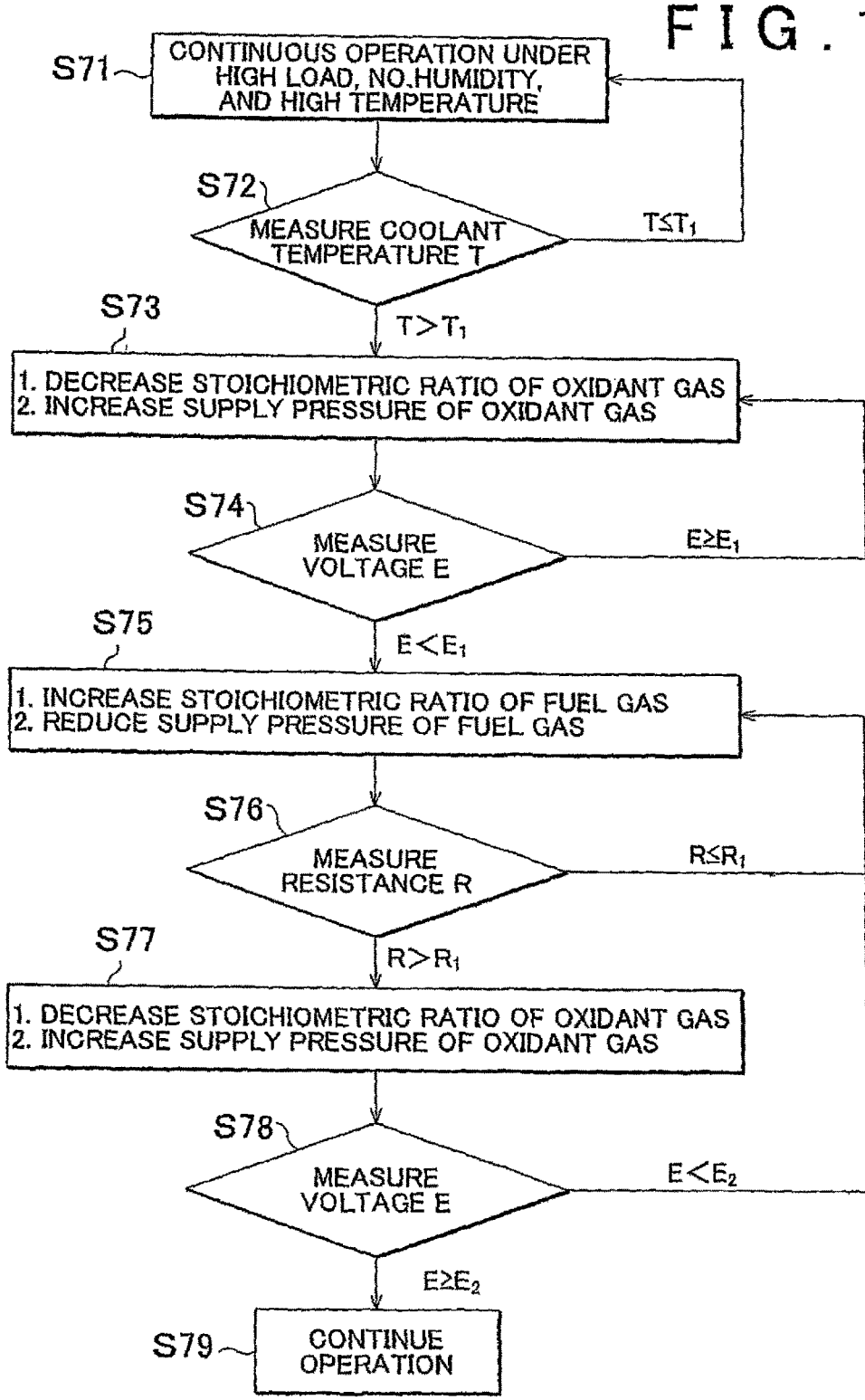
FIG. 11 is a flowchart illustrating a routine of an eighth classic example of the preferable fuel cell system, for carrying out the operating method of the fuel cell of the invention.

FIG. 11 is a flowchart illustrating a routine of an eighth classic example of the preferable fuel cell system, for carrying out the operating method of the fuel cell of the invention. Now, a case in which the fuel cell system is continuously operating under a high load will be assumed (S71). During operation, the coolant temperature T is measured by the coolant temperature measuring device described above every 10 seconds to 10 minutes (S72). If at this time the measured coolant temperature T is equal to or less than a set value $T_1$, then operation continues (S71). If, on the other hand, the coolant temperature T is greater than the set value $T_1$, then the oxidant gas flowrate control apparatus and/or the oxidant gas pressure control apparatus is operated (by the slightly excessive water transfer suppressing control starting apparatus) (S73). This starting apparatus (S73) operates the oxidant gas flowrate control apparatus and/or the oxidant gas pressure control apparatus one or more times until it is determined by the determining apparatus B (i.e., the voltage measurement) (S74) that the amount of water near the oxidant gas flow path outlet is excessive, at which time that operation is stopped (by the slightly excessive water transfer suppressing control stopping apparatus) based on that determination. That is, the operational steps up to this point temporarily make the amount of water near the oxidant gas flow path outlet excessive by suppressing the transfer of only a slightly excessive amount of water from near the oxidant gas flow path outlet to near the oxidant gas flow path inlet through the fuel gas flow path, after some sort of abnormality in the fuel cell has been detected by the coolant temperature measuring device (72) earlier, without determining the position of that abnormality in the oxidant gas flow path.

After the slightly excessive water transfer suppressing control stopping apparatus stops the oxidant gas flowrate control apparatus and/or the oxidant gas pressure control apparatus, the fuel gas flowrate control apparatus and/or the fuel gas pressure control apparatus is operated (by the water transfer promoting control starting apparatus D) (S75). This starting apparatus D operates the fuel gas flowrate control apparatus and/or the fuel gas pressure control apparatus one or more times until it is determined by the determining apparatus A (i.e., the resistance measurement) (S76) that the amount of water near the oxidant gas flow path outlet is insufficient, at which time that operation is stopped (by the water transfer promoting control stopping apparatus D) based on that determination. Next, the oxidant gas flowrate control apparatus and/or the oxidant gas pressure control apparatus is operated (by the water transfer suppressing control starting apparatus D) (S77). Finally, it is determined by the determining apparatus B (i.e., the voltage measurement) (S78) whether the amount of water near the oxidant gas flow path outlet is excessive. If the amount of water is excessive, the water transfer promoting control starting apparatus D (S75) operates the fuel gas flowrate control apparatus and/or the fuel gas pressure control apparatus again. If, on the other hand, the amount of water is not excessive, operation of the fuel cell is continued (S79).

With a fuel cell system having this kind of structure, an appropriate amount of water, which is neither too much nor too little, can be maintained near the oxidant gas flow path inlet and outlet by first making the amount of water near the oxidant gas flow path outlet appropriately excessive using the slightly excessive water transfer suppressing control starting apparatus, then promoting the transfer of water from near the oxidant gas flow path outlet to near the oxidant gas flow path inlet using the water transfer promoting control starting apparatus D, and then increasing the amount of water near the oxidant gas flow path outlet using the water transfer suppressing control starting apparatus D. Also, the fuel cell system of the invention is particularly effective when it includes a fuel cell that has an electrolyte membrane that is unable to maintain its original performance once it has been dry (such as perfluorocarbon sulfonate electrolyte membrane), because it does not give the electrolyte membrane a dry history.

From the same viewpoint, a mode of the operating method of a fuel cell of the invention may be structured as follows. That is, the stoichiometric ratio of the oxidant gas is decreased to within a range between 1.0 and 3.0, inclusive, and/or the oxidant gas pressure is increased to within a range between atmospheric pressure and 0.3 MPa, inclusive, one or more times. Then, after it is determined that the amount of water near the oxidant gas flow path outlet is excessive, the oxidant gas control is stopped. Next, the stoichiometric ratio of the fuel gas is increased to within a range between 1.0 and 10, inclusive, and/or the fuel gas pressure is reduced to within a range between atmospheric pressure and 0.3 MPa, inclusive, one or more times. Then, after it is determined that the amount of water near the oxidant gas flow path outlet is insufficient, the fuel gas control is stopped. Next, the stoichiometric ratio of the oxidant gas is decreased to within a range between 1.0 and 3.0, inclusive, and/or the oxidant gas pressure is increased to within a range between atmospheric pressure and 0.3 MPa, inclusive. If after this it is determined that the amount of water near the oxidant gas flow path outlet is excessive, the fuel gas control is started again. If, on the other hand, it is determined that the amount of water near the oxidant gas flow path outlet is not excessive, the oxidant gas control is stopped and operation of the fuel cell is continued.

With the operating method of a fuel cell of the invention and the fuel cell system preferable for carrying out this operating method, a greater amount of water can be transferred from near the fuel gas flow path outlet to near the oxidant gas flow path inlet through the polymer electrolyte membrane by transferring a greater amount of water in the fuel gas to near the fuel gas flow path outlet after water near the oxidant gas flow path outlet has been transferred to near the fuel gas flow path inlet through the polymer electrolyte membrane. Accordingly, it is possible to adjust the amount of water near the oxidant gas flow path inlet which tends to become dry in the related art, as well as near the oxidant gas flow path outlet which tends to become wet in the related art. As a result, it is possible to prevent water from becoming unevenly distributed on the surface of the single cell while under a non-humid condition and/or a high temperature condition. Also, the fuel cell system of the invention has the determining apparatus so it is possible to accurately ascertain an insufficiency in the amount of water near the oxidant gas flow path inlet.

With the preferable operating method of a fuel cell of the invention and the fuel cell system preferable for carrying out this operating method, a greater amount of water can be transferred from near the fuel gas flow path outlet to near the oxidant gas flow path inlet through the polymer electrolyte membrane by transferring a greater amount of water in the fuel gas to near the fuel gas flow path outlet after water near the oxidant gas flow path outlet has been transferred to near the fuel gas flow path inlet through the polymer electrolyte membrane. Accordingly, it is possible to adjust the amount of water near the oxidant gas flow path inlet which tends to become dry in the related art, as well as near the oxidant gas flow path outlet which tends to become wet in the related art. As a result, it is possible to prevent water from becoming unevenly distributed on the surface of the single cell while under a non-humid condition and/or a high temperature condition. Also, according to the invention, water can be accumulated near the oxidant gas flow path outlet by keeping down the amount of water that is carried away by the oxidant gas and discharged outside of the fuel cell system of the invention. Furthermore, the fuel cell system of the invention has the determining apparatus so it is possible to accurately ascertain an insufficiency or excess in the amount of water near the oxidant gas flow path inlet and outlet.

Next, examples will be described. Measurement of the power generating performance, the dew point-humidity, and the pressure drop following a change in the amount of fuel gas supplied will be explained below. Changes in cell voltage E (V), cell resistance R (mΩ×cm$^2$), anode outlet dew point-humidity (%), cathode output dew point-humidity (%), hydrogen gas pressure drop (kPa), and air pressure drop (kPa), with respect to the change in the stoichiometric ratio of hydrogen gas used as the fuel gas, were measured for a single cell which has the membrane electrode assembly described above, and in which the fuel gas flow path and the oxidant gas flow path are arranged such that the fuel gas (i.e., hydrogen gas) and the oxidant gas (i.e., air) flow in opposite directions. The specific test conditions are as follows.

Figure 12:
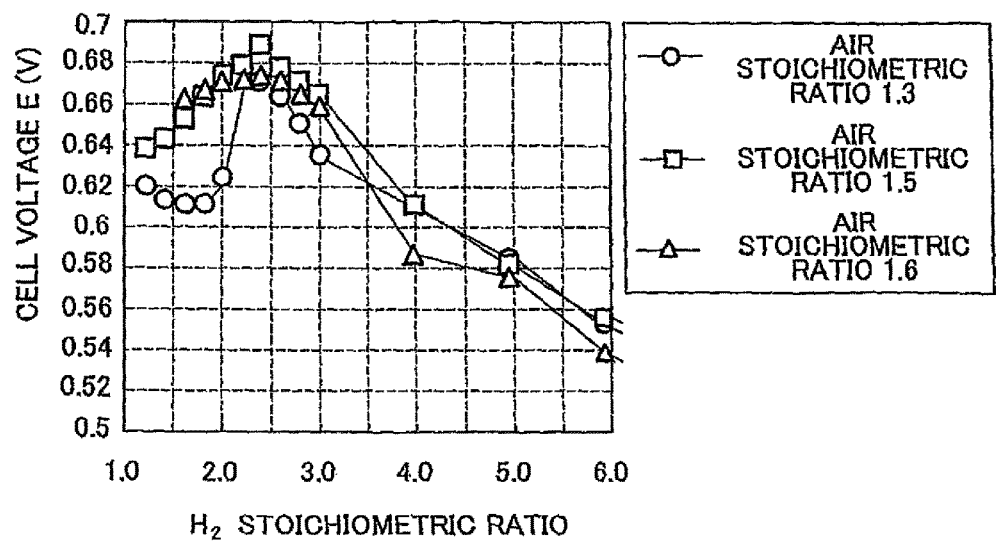
FIG. 12 is a graph showing a change in cell voltage following a change in the stoichiometric ratio of hydrogen gas.
Figure 13:
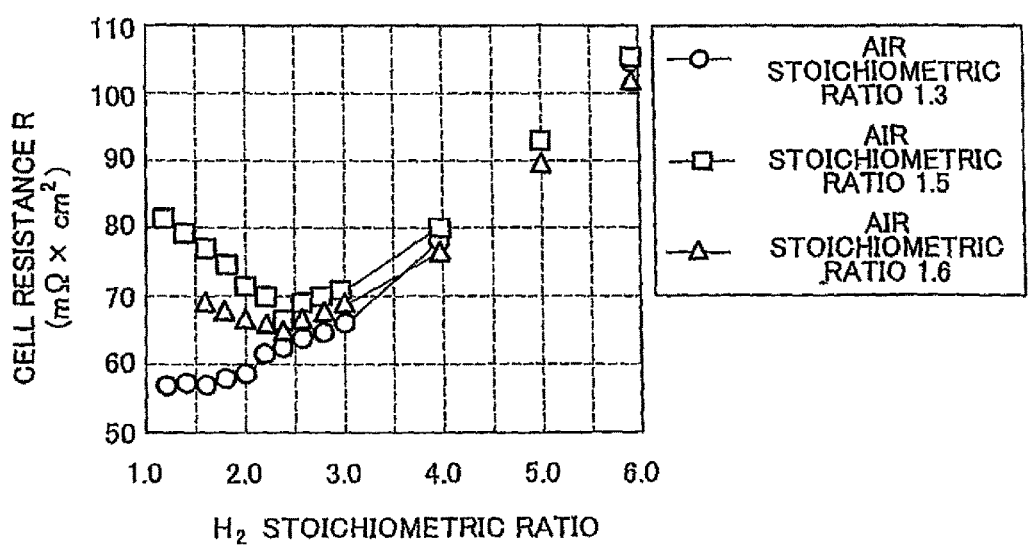
FIG. 13 is a graph showing a change in cell resistance following a change in the stoichiometric ratio of hydrogen gas.

Current density: 1.0 A/cm$^2$
Coolant outlet temperature: 80° C.
Hydrogen gas flowrate: gradually increased to a stoichiometric ratio of 1.2 to 6.0 and measured
Air flowrate: measured at a stoichiometric ratio of 1.3, 1.5, and 1.6, respectively
Gas pressure: 200 kPa×Abs for both hydrogen gas and air
Gas flow path inlet humidity: no humidity in either hydrogen gas flow path or air flow path FIG. 12 is a graph showing a change in cell voltage following a change in the stoichiometric ratio of hydrogen gas, and FIG. 13 is a graph showing a change in cell resistance following a change in the stoichiometric ratio of hydrogen gas. The white circles in the graph indicate data when the air stoichiometric ratio was 1.3. The white squares in the graph indicate data when the air stoichiometric ratio was 1.5, and the white triangles in the graph indicate data when the air stoichiometric data was 1.6. As shown in FIG. 12, at all of these stoichiometric ratios, i.e., 1.3, 1.5, and 1.6, the cell voltage has a local maximum value when the stoichiometric ratio of hydrogen gas is around 2.5. Also, as shown in FIG. 13, at the air stoichiometric ratios of 1.5 and 1.6, the cell resistance has a local minimum value when the stoichiometric ratio of hydrogen gas is around 2.5.

Figure 14:
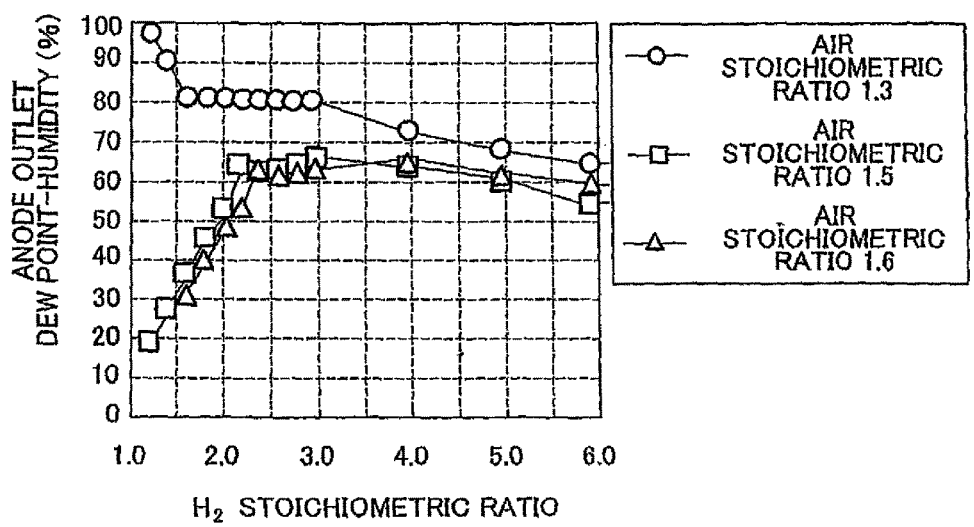
FIG. 14 is a graph showing a change in the dew point-humidity at the anode outlet following a change in the stoichiometric ratio of hydrogen gas.
Figure 15:
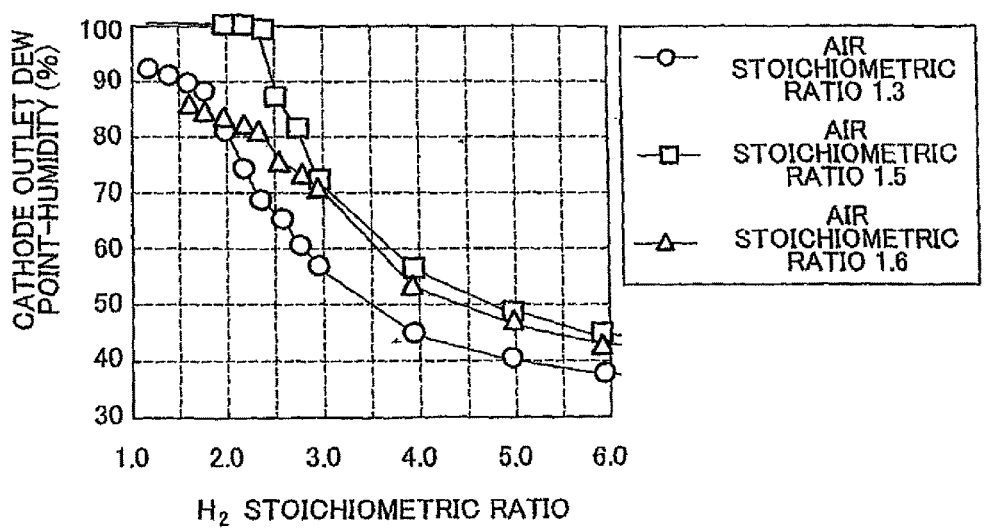
FIG. 15 is a graph showing a change in the dew point-humidity at the cathode outlet following a change in the stoichiometric ratio of hydrogen gas.

FIG. 14 is a graph showing a change in the dew point-humidity at the anode outlet following a change in the stoichiometric ratio of hydrogen gas, and FIG. 15 is a graph showing a change in the dew point-humidity at the cathode outlet following a change in the stoichiometric ratio of hydrogen gas. The white circles, white squares, and white triangles in the graph indicate data just like they do in FIGS. 12 and 13. Some of the anode discharge water that is discharged from the fuel gas flow path outlet is transferred to the oxidant gas flow path inlet on the opposite side of the electrolyte membrane by passing through the electrolyte membrane. Therefore, by checking the anode outlet dew point-humidity, it is possible to know the amount of water at the oxidant gas flow path inlet. Also, by checking the cathode outlet dew point-humidity, it is possible to know the amount of water at the oxidant gas flow path outlet. As shown in FIG. 14, at the air stoichiometric ratios of 1.5 and 1.6, the anode outlet dew point-humidity has a local maximum value around when the stoichiometric ratio of hydrogen gas is around 2.5. Incidentally, when the air stoichiometric ratio is 1.3 (i.e., the white circles), even when the hydrogen gas stoichiometric ratio is increased, high humidity is maintained while the anode outlet dew point-humidity remains saturated. Also, as shown in FIG. 15, at each air stoichiometric ratio, i.e., 1.3, 1.5, and 1.6, there is an inflection point on the graph of the cathode outlet dew point-humidity which substantially monotonically decreases when the stoichiometric ratio of hydrogen gas is around 2.5.

Figure 16:
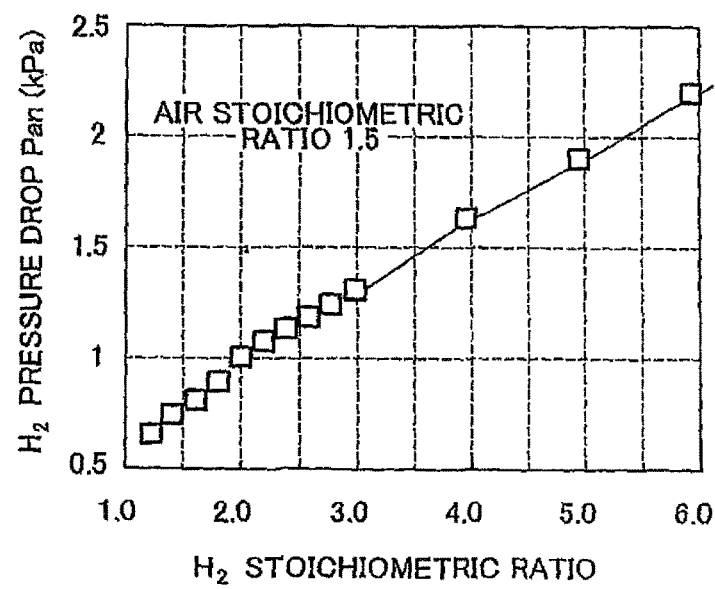
FIG. 16 is a graph showing a change in the hydrogen gas pressure drop following a change in the stoichiometric ratio of hydrogen gas.

FIG. 16 is a graph showing a change in the hydrogen gas pressure drop following a change in the stoichiometric ratio of hydrogen gas. Incidentally, the air stoichiometric ratio at this time is 1.5. From this graph it is evident that the hydrogen gas pressure drop increases in proportion to the stoichiometric ratio of the hydrogen gas.

Figure 17:
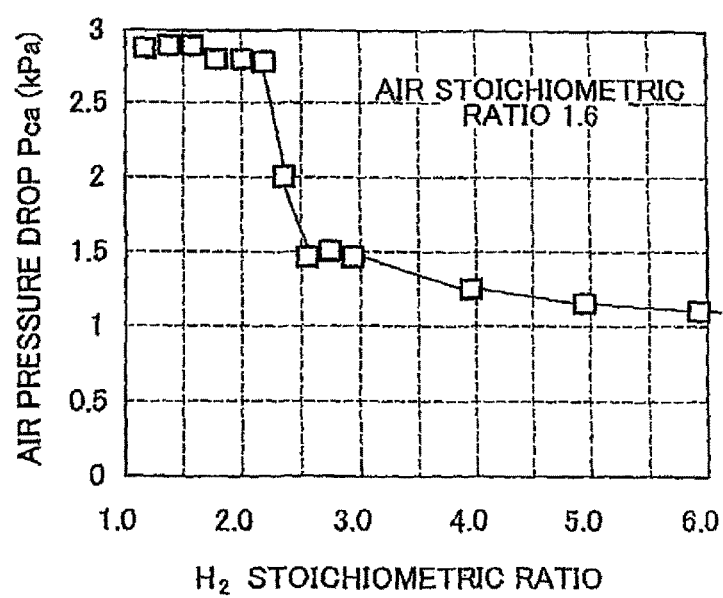
FIG. 17 is a graph showing a change in the air pressure drop following a change in the stoichiometric ratio of hydrogen gas.

FIG. 17 is a graph showing a change in the air pressure drop following a change in the stoichiometric ratio of hydrogen gas. Incidentally, the air stoichiometric ratio at this time is 1.6. From this graph it is evident that the air pressure drop decreases sharply at a hydrogen gas stoichiometric ratio of around 2.5, which is also the hydrogen gas stoichiometric ratio at which the voltage and resistance values are highest, as described above.

Now the effects that the amount of fuel gas supplied has on the power generating performance and the uneven distribution of water on the surface of the single cell will be examined. From the power generating performance measurements described above, it is evident that the greatest power generating performance is obtained when the stoichiometric ratio of hydrogen gas is within a range between 1.5 and 3.0, inclusive, because the local maximum value of the cell voltage is obtained when that stoichiometric ratio is around 2.5 and the local minimum value of the cell resistance is obtained when that stoichiometric ratio is also around 2.5. Also, from the dew point-humidity measurements described above, it is evident that the greatest increase efficiency in the amount of water that passes through the electrolyte membrane from the fuel gas flow path to the oxidant gas flow path is obtained when the stoichiometric ratio of hydrogen gas is within a range between 1.0 and 4.0 because the local maximum value on the graph of the anode outlet dew point-humidity is obtained when that stoichiometric ratio is around 2.5 and there is an inflection point on the graph of the cathode outlet dew point-humidity when that stoichiometric ratio is also around 2.5. Moreover, from the pressure drop measurements described above, it is evident that the air pressure drop decreases sharply at a hydrogen gas stoichiometric ratio of around 2.5, which is also the hydrogen gas stoichiometric ratio at which the voltage and resistance values are highest, as described above. Therefore, the following can be considered with respect to the effect that the amount of fuel gas supplied has on power generating performance, gas pressure drop and the uneven distribution of water on the surface of the single cell.

When the stoichiometric ratio of hydrogen gas is less than 1.0, the amount of water carried by the hydrogen gas decreases which interrupts the circulation of water shown in FIG. 2. As a result, the water becomes unevenly distributed on the surface of the single cell, which leads to a decrease in power generating performance. Furthermore, the uneven distribution of water causes localized clogging of the oxidant gas flow path, which increases the air gas pressure drop. Also, if the stoichiometric ratio of hydrogen gas exceeds 4.0, the amount of water carried by the hydrogen gas increases more than necessary such that the electrolyte membrane at the fuel gas flow path inlet becomes dry. As a result, the amount of water that passes through the electrolyte membrane from the oxidant gas flow path outlet to the fuel gas flow path inlet decreases, which leads to a decrease in power generating performance. Furthermore, the decrease in the amount of water causes the oxidant gas flow path to become dry so the air gas pressure drop decreases.

Thus, by measuring the power generating performance, the dew point-humidity, and the pressure drop following a change in the amount of fuel gas supplied in the example embodiment, it became evident that the amount of water near the oxidant gas flow path inlet can be increased, enabling a decline in power generating performance to be suppressed, without drying out the electrolyte membrane, when the stoichiometric ratio of hydrogen gas, which is one type of fuel gas, is in a range between 1.0 to 4.0.

The invention claimed is:

1. A fuel cell system which is operated under at least one of conditions that i) there be no humidity or ii) a temperature of a membrane electrode assembly be at least 70° C., comprising:

a fuel cell that has a stack including a plurality of cells, at least one of the plurality of cells including the membrane electrode assembly in which a polymer electrolyte membrane is sandwiched between a pair of electrodes, and to which fuel gas and oxidant gas is supplied, the fuel cell having a fuel gas flow path on one side of the membrane electrode assembly and an oxidant gas flow path on the other side of the membrane electrode assembly, and the fuel gas flow path and the oxidant gas flow path being arranged such that the fuel gas and the oxidant gas flow in opposite directions with respect to one another on the membrane electrode assembly, the fuel gas flow path including a fuel gas flow path inlet and a fuel gas flow path outlet, and the oxidant gas flow path including an oxidant gas flow path inlet and an oxidant gas flow path outlet;

a controller configured to prevent uneven distribution of water on a surface of the cell, the controller including a determining apparatus programmed to determine an amount of water near the oxidant gas flow path inlet; and a fuel gas control apparatus programmed to increase the fuel gas flow rate and/or programmed to reduce a fuel gas pressure such that the amount of water near the oxidant gas flow path inlet is increased if it is determined by the determining apparatus that the amount of water near the oxidant gas flow path inlet is insufficient.

2. The fuel cell system according to claim 1, wherein the determining apparatus is a determining apparatus B which measures a resistance value and a voltage of an overall fuel cell and determines that the amount of water near the oxidant gas flow path inlet is excessive and/or that an amount of water near the oxidant gas flow path outlet is excessive, when the resistance value is less than 105% of a minimum value of a premeasured resistance and the voltage is less than 95% of a maximum value of a premeasured voltage of the cell and/or the stack at each of a plurality of temperatures.

3. The fuel cell system according to claim 1, wherein the determining apparatus is a determining apparatus C which measures a pressure drop of oxidant gas flowing through the oxidant gas flow path and determines that the amount of water near the oxidant gas flow path inlet is insufficient and/or that an amount of water near the oxidant gas flow path outlet is insufficient, when the pressure drop is less than 105% of a minimum value of a premeasured pressure drop of oxidant gas flowing through the oxidant gas flow path.

4. The fuel cell system according to claim 1, wherein the determining apparatus is a determining apparatus D which measures a pressure drop of oxidant gas flowing through the oxidant gas flow path and determines that the amount of water near the oxidant gas flow path inlet is excessive and/or that an amount of water near the oxidant gas flow path outlet is excessive, when the pressure drop exceeds 105% of a maximum value of a premeasured pressure drop of oxidant gas flowing through the oxidant gas flow path.

5. The fuel cell system according to claim 1, wherein the determining apparatus is a determining apparatus D which measure a pressure drop of oxidant gas flowing through the oxidant gas flow path and determined that the amount of water near the oxidant gas flow path inlet is excessive and/or that an amount of water near the oxidant gas flow path outlet is excessive, when the pressure drop exceeds 105% of a maximum value of a premeasured pressure drop of oxidant gas flowing through the oxidant gas flow path; and wherein the fuel gas control apparatus increases the fuel gas flow rate if it is determined that the amount of water near the oxidant gas flow outlet is excessive.

6. The fuel cell system according to claim 1, wherein a fuel gas pressure regulating valve is provided near the fuel gas flow path outlet, and the fuel gas control apparatus is a fuel gas pressure control apparatus that reduces the fuel gas pressure by adjusting the fuel gas pressure regulating valve.

7. The fuel cell system according to claim 6, wherein the fuel gas pressure control apparatus adjusts the fuel gas pressure regulating valve to reduce the fuel gas pressure to within a range between atmospheric pressure and 0.3 MPa, inclusive.

8. The fuel cell system according to claim 1, further comprising:
an oxidant gas supply apparatus that supplies an oxidant gas to the fuel cell, and
an oxidant gas control apparatus that is an oxidant gas flow rate control apparatus that reduces the oxidant gas flow rate by adjusting the oxidant gas supply apparatus.

9. The fuel cell system according to claim 8, wherein the oxidant gas flow rate control apparatus adjusts the oxidant gas supply apparatus to decrease a stoichiometric ratio of the oxidant gas to within a range between 1.0 and 3.0, inclusive.

10. The fuel cell system according to claim 1, further comprising:
a fuel gas supply apparatus that supplies fuel gas to the fuel cell,
wherein the fuel gas control apparatus is a fuel gas flow rate control apparatus that increases the fuel gas flow rate by adjusting the fuel gas supply apparatus.

11. The fuel cell system according to claim 10, wherein the fuel gas flow rate control apparatus adjusts the fuel gas supply apparatus to increase a stoichiometric ratio of the fuel gas to within a range between 1.0 and 10, inclusive.

12. The fuel cell system according to claim 1, further comprising:
an oxidant gas pressure regulating valve which is arranged near the oxidant gas flow path outlet and regulates the pressure of the oxidant gas,
an oxidant gas control apparatus that is an oxidant gas pressure control apparatus that increases the oxidant gas pressure by adjusting the oxidant gas pressure regulating valve.

13. The fuel cell system according to claim 12, wherein the oxidant gas pressure control apparatus adjusts the oxidant gas pressure regulating valve to increase the oxidant gas pressure to within a range between atmospheric pressure and 0.3 MPa, inclusive.

14. The fuel cell system according to claim 1, wherein
the determining apparatus is a determining apparatus A which measures a resistance value of an overall fuel cell and determines that the amount of water near the oxidant gas flow path inlet is insufficient and/or that an amount of water near the oxidant gas flow path outlet is insufficient, when the resistance value exceeds 105% of a minimum value of a premeasured resistance of the cell and/or the stack at each of a plurality of temperatures,
the determining apparatus is a determining apparatus B which measures a resistance value and a voltage of the overall fuel cell and determines that the amount of water near the oxidant gas flow path inlet is excessive and/or that the amount of water near the oxidant gas flow path outlet is excessive, when the resistance value is less than 105% of the minimum value of the premeasured resistance and the voltage is less than 95% of a maximum value of a premeasured voltage of the cell and/or the stack at each of a plurality of temperatures,
the determining apparatus is a determining apparatus C which measures a pressure drop of oxidant gas flowing through the oxidant gas flow path and determines that the amount of water near the oxidant gas flow path inlet is insufficient and/or that the amount of water near the oxidant gas flow path outlet is insufficient, when the pressure drop is less than 105% of a minimum value of a premeasured pressure drop of oxidant gas flowing through the oxidant gas flow path, or
the determining apparatus is a determining apparatus D which measures the pressure drop of oxidant gas flowing through the oxidant gas flow path and determines that the amount of water near the oxidant gas flow path inlet is excessive and/or that the amount of water near the oxidant gas flow path outlet is excessive, when the pressure drop exceeds 105% of a maximum value of the premeasured pressure drop of oxidant gas flowing through the oxidant gas flow path, the fuel cell system, comprising:
an oxidant gas control apparatus;
the determining apparatus A and/or the determining apparatus C;
the determining apparatus B and/or the determining apparatus D;
a water transfer promoting control starting apparatus A which operates the fuel gas control apparatus one or more times after it is determined by the determining apparatus A and/or C that the amount of water near the oxidant gas flow path inlet is insufficient;
a water transfer promoting control stopping apparatus A which stops the fuel gas control apparatus after it is determined by the determining apparatus A and/or C that the amount of water near the oxidant gas flow path outlet is insufficient after the water transfer promoting control starting apparatus A operates the fuel gas control apparatus;
a water transfer suppressing control starting apparatus A which operates the oxidant gas control apparatus one or more times after the water transfer promoting control stopping apparatus A stops the fuel gas control apparatus;

a water transfer suppressing control stopping apparatus A which stops the oxidant gas control apparatus after it is determined by the determining apparatus B and/or D that the amount of water near the oxidant gas flow path outlet is excessive; and an insufficient water amount final determining apparatus A which, after the water transfer suppressing control stopping apparatus A stops the oxidant gas control apparatus, has the water transfer promoting control starting apparatus A operate the fuel gas control apparatus again if it is determined by the determining apparatus A and/or C that the amount of water near the oxidant gas flow path inlet is insufficient, and continues to operate the fuel cell if it is determined by the determining apparatus A and/or C that the amount of water near the oxidant gas flow path inlet is not insufficient.

15. The fuel cell system according to claim 1, wherein the fuel gas control apparatus transfers water from a fuel gas flow path outlet side to an oxidant gas flow path inlet side by increasing the fuel gas flow rate and/or reducing the fuel gas pressure, and wherein the fuel cell system further comprises an oxidant gas control apparatus promotes a condition where an amount of water is excessive in an oxidant gas side by decreasing an oxidant gas flow rate and/or increasing an oxidant gas pressure.

16. The fuel cell system according to claim 15, wherein the fuel gas control apparatus transfers water from the fuel gas flow path outlet side to the oxidant gas flow path inlet side by increasing the fuel gas flow rate.

17. The fuel cell system according to claim 1, wherein
the determining apparatus is a determining apparatus A which measures a resistance value of an overall fuel cell and determines that the amount of water near the oxidant gas flow path inlet is insufficient and/or that an amount of water near the oxidant gas flow path outlet is insufficient, when the resistance value exceeds 105% of a minimum value of a premeasured resistance of the cell and/or the stack at each of a plurality of temperatures.

18. The fuel cell system according to claim 1, wherein
the determining apparatus determines an amount of water near the oxidant gas flow path outlet, and
the fuel gas control apparatus increases the fuel gas flow rate and/or reduces the fuel gas pressure such that the amount of water near the oxidant gas flow path inlet is increased if it is determined by the determining apparatus that the amount of water near the oxidant gas flow path outlet is excessive.

19. The fuel cell system according to claim 1, wherein
the determining apparatus determines the amount of water near an oxidant gas flow path outlet, and
the controller includes an oxidant gas control apparatus that decreases an oxidant gas flow rate and/or increases an oxidant gas pressure such that an amount of water that is carried out of the cell by the oxidant gas is decreased and an amount of water that can be transferred from an oxidant gas flow path outlet side to a fuel gas flow path inlet side is increased if it is determined by the determining apparatus that the amount of water near the oxidant gas flow path inlet is insufficient and/or the amount of water near the oxidant gas flow path outlet is insufficient.

20. The fuel cell system according to claim 1, wherein the fuel gas control apparatus is programmed to supply a non-humidified fuel gas and programmed to increase the fuel gas flow rate and/or programmed to reduce the fuel gas pressure such that the amount of water near the oxidant gas flow path inlet is increased if it is determined by the determining apparatus that the amount of water near the oxidant gas flow path inlet is insufficient.

21. The fuel cell system according to claim 1, further comprising a fuel gas pressure regulating valve provided in the fuel gas flow path, wherein the fuel gas control apparatus is programmed to adjust the fuel gas pressure regulating valve to increase the fuel gas flow rate and/or reduce the fuel gas pressure such that the amount of water near the oxidant gas flow path inlet is increased if it is determined by the determining apparatus that the amount of water near the oxidant gas flow path inlet is insufficient.

22. The fuel cell system according to claim 1, wherein the fuel gas control apparatus is programmed to increase the fuel gas flow rate and/or programmed to reduce the fuel gas pressure such that the amount of water near the oxidant gas flow path inlet is increased while the fuel cell system is operated if it is determined by the determining apparatus that the amount of water near the oxidant gas flow path inlet is insufficient.

23. The fuel cell system according to claim 1, wherein the fuel gas control apparatus is programmed to supply non-humidified fuel gas and programmed to increase the fuel gas flow rate such that the amount of water near the oxidant gas flow path inlet is increased if it is determined by the determining apparatus that the amount of water near the oxidant gas flow path inlet is insufficient.

* * * * *